United States Patent
McCormick et al.

(10) Patent No.: US 9,967,045 B2
(45) Date of Patent: May 8, 2018

(54) RANDOMIZED MESH NETWORK ROUTING

(71) Applicant: Huawei Technologies Canada Co., Ltd., Kanata (CA)

(72) Inventors: William Carson McCormick, Ottawa (CA); Francis Patrick Kelly, Cambridge (GB)

(73) Assignee: Huawei Technologies Canada Co., Ltd., Kanata (CA)

( * ) Notice: Subject to any disclaimer, the term of this patent is extended or adjusted under 35 U.S.C. 154(b) by 184 days.

(21) Appl. No.: 15/174,452

(22) Filed: Jun. 6, 2016

(65) Prior Publication Data

US 2017/0353259 A1     Dec. 7, 2017

(51) Int. Cl.
| H04W 4/00 | (2018.01) |
| H04J 3/16 | (2006.01) |
| H04W 72/12 | (2009.01) |
| H04L 1/00 | (2006.01) |
| H04W 84/18 | (2009.01) |

(52) U.S. Cl.
CPC ............ H04J 3/1694 (2013.01); H04L 1/002 (2013.01); H04W 72/1263 (2013.01); H04W 84/18 (2013.01)

(58) Field of Classification Search
None
See application file for complete search history.

(56) References Cited

U.S. PATENT DOCUMENTS

| 2008/0069034 | A1 | 3/2008 | Buddhikot et al. | |
| 2009/0010205 | A1* | 1/2009 | Pratt, Jr. | G01D 21/00 370/328 |
| 2010/0158628 | A1 | 5/2010 | Wu et al. | |
| 2010/0232299 | A1 | 9/2010 | Conway | |
| 2011/0225311 | A1 | 9/2011 | Liu et al. | |
| 2012/0008542 | A1* | 1/2012 | Koleszar | H04L 45/32 370/312 |
| 2012/0108276 | A1* | 5/2012 | Lang | H04L 27/0006 455/501 |
| 2012/0195212 | A1* | 8/2012 | Zhang | H04W 72/1215 370/252 |
| 2013/0262648 | A1 | 10/2013 | Orlik et al. | |
| 2015/0195670 | A1* | 7/2015 | Agee | H04W 4/005 375/133 |

(Continued)

OTHER PUBLICATIONS

Hajek, B., et al., "Random Processes for Engineers," Cambridge University Press., Mar. 2015, 448 pgs.
(Continued)

Primary Examiner — Anh-Vu Ly
(74) Attorney, Agent, or Firm — Slater Matsil, LLP

(57) ABSTRACT

A time domain multiplexed (TDM) routing schedule for a wireless mesh network can be generated using a Markov chain process. In particular, synchronized paths between access nodes and gateways in the mesh network can be added to, and removed from, the TDM routing schedule in an iterative fashion according to each individual state in a state progression of a Markov chain, with each state of the Markov chain mapping a different combination of synchronized paths to the TDM routing schedule. In some embodiments, transitioning between states of a Markov chain is performed according to a proportionally fair transition rate.

24 Claims, 25 Drawing Sheets

(56) References Cited

U.S. PATENT DOCUMENTS

2016/0007371 A1* 1/2016 Pietraski ............ H04W 72/1263
370/315

OTHER PUBLICATIONS

Wang, P., et al., "Practical Computation of Optimal Schedules in Multihop Wireless Networks," IEEE/ACM Transactions on Networking, vol. 19, No. 2, Apr. 2011, pp. 305-318.

Chen, M., et al., "Markov Approximation for Combinatorial Network Optimization," Proceedings IEEE INFCOM, Mar. 14-19, 2010, 9 pages.

* cited by examiner

321 ↗

◄── INTER-LINK INTERFERENCE ──►

| TIME / LINK | 1 | 2 | 3 | 4 | 5 | 6 |
|---|---|---|---|---|---|---|
| 114 | 210 | | | | | |
| 123 | | | | | | |
| 125 | | | | | | |
| 136 | | | | X | | |
| 145 | | 240 | X | | | |
| 147 | | 210 | | | | |
| 156 | | X | 240 | | | |
| 158 | | | | | | |
| 169 | | | | 240 | | |
| 178 | | | 210 | X | | |
| 189 | | | X | 210 | | |

◄── INTER-LINK INTERFERENCE ──►

| TIME / LINK | 1 | 2 | 3 | 4 | 5 | 6 |
|---|---|---|---|---|---|---|
| 114 | 210 | | | | | |
| 123 | | | | | | |
| 125 | | | | | | |
| 136 | 230 | X | | X | | |
| 145 | | 240 | X | | | |
| 147 | | 210 | | | | |
| 156 | | X | 240 | | | |
| 158 | | | | | | |
| 169 | X | 230 | | 240 | | |
| 178 | | | 210 | X | | |
| 189 | | | X | 210 | | |

INTER-LINK INTERFERENCE ↔

| TIME / LINK | 1 | 2 | 3 | 4 | 5 | 6 |
|---|---|---|---|---|---|---|
| 114 | 210 | | | | | |
| 123 | | | | | | |
| 125 | | | 220 | | | |
| 136 | 230 | X | | X | | |
| 145 | | 240 | X | | | |
| 147 | | 210 | | | | |
| 156 | | X | 240 | | | |
| 158 | | | | 220 | | |
| 169 | X | 230 | | 240 | | |
| 178 | | | 210 | X | X | |
| 189 | | | X | 210 | 220 | |

INTER-LINK INTERFERENCE ↔

| TIME / LINK | 1 | 2 | 3 | 4 | 5 | 6 |
|---|---|---|---|---|---|---|
| 114 | 210 | | | | | |
| 123 | | | | | | |
| 125 | | | 220 | | | |
| 136 | 230 | X | | | | |
| 145 | | | | | | |
| 147 | | 210 | | | | |
| 156 | | | | | | |
| 158 | | | | 220 | | |
| 169 | X | 230 | | | | |
| 178 | | | 210 | X | X | |
| 189 | | | X | 210 | 220 | |

◄──► INTER-LINK INTERFERENCE

| TIME / LINK | 1 | 2 | 3 | 4 | 5 | 6 |
|---|---|---|---|---|---|---|
| 114 | 210 | | | | | |
| 123 | | | | | | |
| 125 | | | 220 | | | |
| 136 | 230 | X | | | | |
| 145 | | | | | | |
| 147 | | 210 | | | | |
| 156 | | | | | | |
| 158 | | | | 220 | | |
| 169 | X | 230 | | | | |
| 178 | 270 | X | 210 | X | X | |
| 189 | X | 270 | X | 210 | 220 | |

◄──► INTER-LINK INTERFERENCE

| TIME / LINK | 1 | 2 | 3 | 4 | 5 | 6 |
|---|---|---|---|---|---|---|
| 114 | 210 | | | | | |
| 123 | | | | | | |
| 125 | | | 220 | | | |
| 136 | 230 | X | | | | |
| 145 | | | | | | |
| 147 | | 210 | | | | |
| 156 | | | | | | |
| 158 | | | | 220 | | |
| 169 | X | 230 | | | | |
| 178 | 270 | X | 210 | X | X | X |
| 189 | X | 270 | X | 210 | 220 | 280 |

← INTER-LINK INTERFERENCE →

| TIME / LINK | 1 | 2 | 3 | 4 | 5 | 6 |
|---|---|---|---|---|---|---|
| 114 | 210 | | | | | |
| 123 | | | | | | |
| 125 | | | 220 | | | |
| 136 | 230 | X | | | X | |
| 145 | | | | X | | |
| 147 | | 210 | | | | |
| 156 | | | | 250 | | |
| 158 | | | | 220 | | |
| 169 | X | 230 | | | 250 | |
| 178 | 270 | X | 210 | X | X | X |
| 189 | X | 270 | X | 210 | 220 | 280 |

← INTER-LINK INTERFERENCE →

| TIME / LINK | 1 | 2 | 3 | 4 | 5 | 6 |
|---|---|---|---|---|---|---|
| 114 | 210 | | | | | |
| 123 | | | | | | |
| 125 | | | 220 | | | |
| 136 | 230 | X | X | | X | |
| 145 | 240 | X | | X | | |
| 147 | | 210 | | | | |
| 156 | X | 240 | | 250 | | |
| 158 | | | | 220 | | |
| 169 | X | 230 | 240 | | 250 | |
| 178 | 270 | X | 210 | X | X | X |
| 189 | X | 270 | X | 210 | 220 | 280 |

← → INTER-LINK INTERFERENCE

| TIME / LINK | 1 | 2 | 3 | 4 | 5 | 6 |
|---|---|---|---|---|---|---|
| 114 | 210 | | | | | |
| 123 | | | | | | |
| 125 | | | 220 | | | |
| 136 | 230 | X | X | X | X | |
| 145 | 240 | X | | X | | |
| 147 | | 210 | | | | |
| 156 | X | 240 | | 250 | | |
| 158 | | | | 220 | | |
| 169 | X | 230 | 240 | 260 | 250 | |
| 178 | 270 | X | 210 | X | X | X |
| 189 | X | 270 | X | 210 | 220 | 280 |

| TIME / LINK | 1 | 2 | 3 | 4 | 5 | 6 |
|---|---|---|---|---|---|---|
| 114 | 210 | | | | | |
| 123 | | | | | | |
| 125 | | | 220 | | | |
| 136 | 230 | X | X | X | X | |
| 145 | 240 | X | | X | | |
| 147 | | 210 | | | | |
| 156 | X | 240 | | 250 | | |
| 158 | | | | 220 | | |
| 169 | X | 230 | 240 | 260 | 250 | |
| 178 | 270 | X | 210 | X | X | X |
| 189 | X | 270 | X | 210 | 220 | 280 |

US 9,967,045 B2

RANDOMIZED MESH NETWORK ROUTING

TECHNICAL FIELD

The present invention relates generally to managing the allocation of resources in a network, and in particular embodiments, to techniques and mechanisms for randomized mesh network routing.

BACKGROUND

Next-generation wireless networks may adopt millimeter wave (mmWave) wireless mesh backhaul networks in place of, or addition to, traditional wireline (e.g., fiber optic) backhaul networks. In general, mmWave signals refer to wireless transmissions over carrier frequencies between 6 Gigahertz (GHz) and 300 GHz. Due to the free space path loss of carrier frequencies exceeding 6 GHz, mmWave signals tend to exhibit high, oftentimes unacceptable, packet loss rates when transmitted over relatively long distances. Beamforming may be used to extend the range of mmWave signals to a distance that is suitable for implementation in mesh backhaul networks. However, the highly directional nature of beamformed mmWave signals may have the unintended consequence of "pass through interference" between the nodes (e.g., access points, gateways, etc.) forming the mesh backhaul network.

SUMMARY OF THE INVENTION

Technical advantages are generally achieved, by embodiments of this disclosure which describe techniques and mechanisms for randomized mesh network routing.

In accordance with an embodiment, a method for scheduling wireless transmissions is provided. In this example, the method includes selecting routes between access nodes and one or more gateways in a wireless mesh network, and mapping wireless links in at least some of the routes to timeslots of a frame to form a plurality of synchronized paths between the access nodes and the gateways. The method further includes iteratively adding, or removing, an individual one of the plurality of synchronized paths to, or from, a time division multiplexed (TDM) routing schedule according to each individual state in a state progression of a Markov chain, and instructing the access nodes and the one or more gateways to communicate messages over the wireless links according the TDM routing schedule. The TDM routing schedule includes a different subset of synchronized paths for each state in the Markov chain. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which:

FIGS. 4A-4K illustrate diagrams of frame configurations corresponding to the different states of the Markov chain progression illustrated in FIG. 3;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1A:
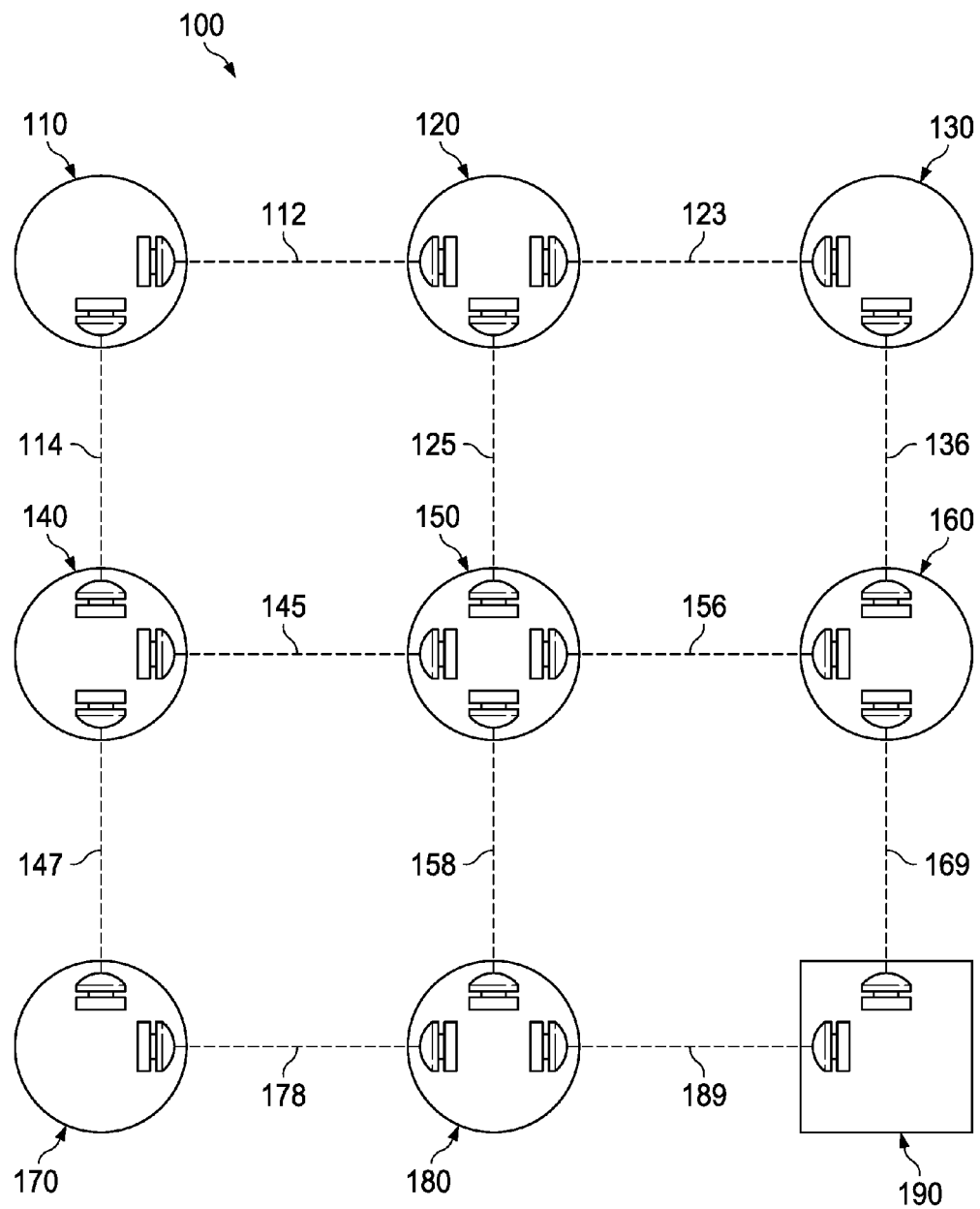
FIGS. 1A-1C illustrates a diagram of a wireless mesh network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. Although much of this disclosure are discussed in the context of beamformed mmWave transmissions in a wireless backhaul network, those of ordinary skill in the art will understand that the inventive aspects provided herein may be applied in any wireless mesh network, including those using non-beamformed transmissions over lower carrier frequencies. Aspects of this disclosure relate to Markov chains and Markov processes. A general description of Markov processes is provided in the text entitled "Random Processes for Engineers" by Bruce Hajek, which is incorporated herein by reference as if reproduced in its entirety.

The term "pass through interference" generally refers to interference experienced by a neighboring node as a result of a transmission between two neighboring nodes in a wireless mesh network. One way of mitigating pass through interference is to schedule transmissions over links in the wireless mesh network according to a time division multiplexed (TDM) scheme. As an example, consider a wireless mesh network that includes two access nodes (e.g., base stations) and one gateway positioned in-between the access nodes. In such an example, a transmission from either of the access nodes to the gateway may result in high levels of interference over a wireless backhaul link between the gateway and the other access node.

In larger mesh backhaul networks, there may be multiple hops (e.g., multiple backhaul links) along a given route between an access node and a gateway. In such networks, TDM schemes may schedule links of a given route to timeslots in a frame to form synchronized paths between the access nodes and gateways. As used herein, the term "synchronized path" refers to the scheduling (or mapping) of links in a given route to timeslots in frame. In that context, mapping the links in a given route to the timeslots of the frame forms a "synchronized path" through the wireless mesh network. For larger wireless mesh networks (e.g., networks with many nodes, links, and potential routes), determining which synchronized paths to include in the TDM routing schedule becomes a relatively complex optimization problem, particularly when loading is unevenly distributed across the access nodes and fluctuates over time.

Embodiments of this disclosure simplify that optimization problem by iteratively adding, and removing, individual synchronized paths to a TDM routing schedule according to a Markov chain. As used herein, the term "Markov chain" refers to a state diagram for modeling the communication of signaling over a mesh network. In particular, each state of a Markov chain maps a different combination of synchronized paths to the TDM routing schedule. Accordingly, an individual synchronized path is either added or removed when transitioning from one state of the Markov chain to another. In some embodiments, transitioning between states of a Markov chain is performed according to a proportionally fair transition rate. Before transitioning to a new state, a scheduler may determine whether it is feasible to add a synchronized path associated with the Markov state to an existing TDM routing schedule based on an interference model of the mesh network. In one embodiment, the feasibility determination is based on a protocol interference model that prohibits transmissions from being scheduled over two or more interfering links during the same timeslot of the frame. In another embodiment, the feasibility determination is based on a physical interference model that permits transmissions to be scheduled over two or more interfering links during the same timeslot of the frame when an interference cost associated with the transmissions is less than a threshold. In such an embodiment, the interference costs may vary based on the amount of interference experienced between transmissions performed over the two or more interfering links during the same period. The amount of interference experienced between the transmissions may vary according to a number of factors, such as the path loss between the transmitters and receivers, as well as the transmission parameters (e.g., transmit power levels, beam-directions, etc.) used to perform the respective transmissions.

In some embodiments, a transition rate of the Markov chain may be adjusted following a transition from a previous state to a subsequent state. The transition rate may be adjusted periodically, e.g., after each transition, every other transition, every Nth transition (where N is an integer greater than one), etc. Alternatively, the transition rate may be adjusted aperiodically, e.g., randomly, at the discretion of the network operator, after a triggering condition has occurred, etc. The transition rate may be adjusted according to one or more characteristics, parameters, and/or values associated with the network and/or the Markov chain. For example, the transition rate may be adjusted based on a ratio of users to synchronized paths specified by the subsequent state in the Markov chain. In such an example, the ratio of users to synchronized paths may include the summation of ratios between users accessing each of the access nodes and synchronized paths assigned to the corresponding access point in the TDM routing schedule. In one embodiment, the transition rate is a function of beta ($\beta$). By way of example, the path setup rate at a given node (access node "s") may be determined according to the following equations: setup-rate(s)=gamma exp(beta $d_s/m_s$); release_rate(s)=gamma, where setup-rate(s) is the path setup rate for access node s, release-rate(s) is the path release rate for access node s, $d_s$ is the number of users at the access node S, $m_s$ is the number of paths setup for access node s, and gamma is a system parameter. In such an example, the transition rate may be adjusted by re-computing beta according to the ratio of users to synchronized paths specified. By way of example, beta may be computed according to the following equation $$\text{beta} = \frac{\ln\left(\frac{\text{intensity}}{1-\text{intensity}}\right) * \text{nodes}}{\text{sum\_of\_ratios\_of\_users\_to\_assigned\_paths}},$$

wherein intensity is a control variable corresponding to how aggressive the algorithm is in attempting to find paths, nodes is the number of access nodes in the networks, and the sum_of_ratios_of_users_to_assigned_paths is the summation of ratios between users accessing each access node and the number of paths assigned to the access node in the TDM schedule specified by the current state in the Markov chain. Other examples are also possible. These and other inventive aspects are described in greater detail below.

Figure 1B:
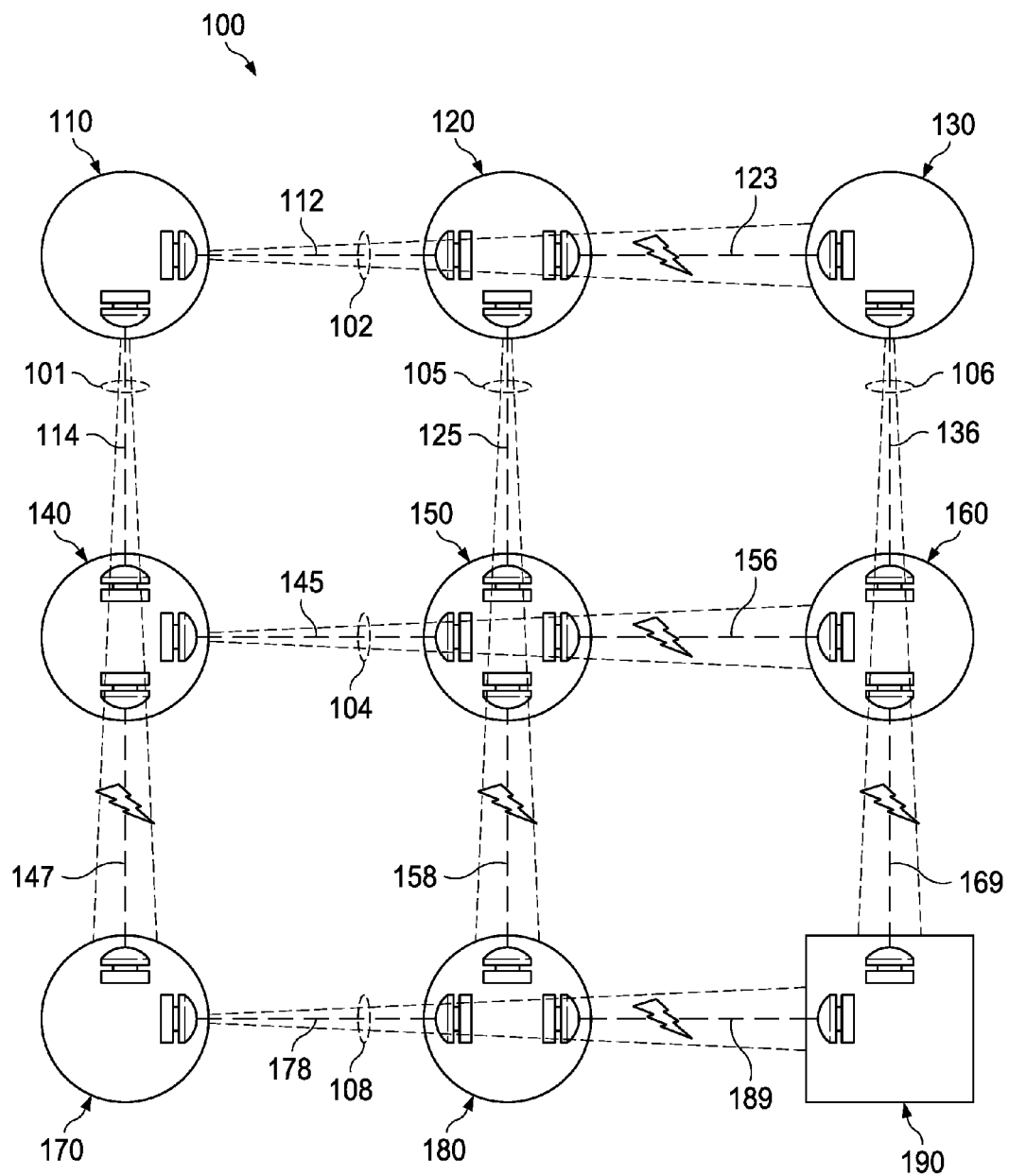
Figure 1C:
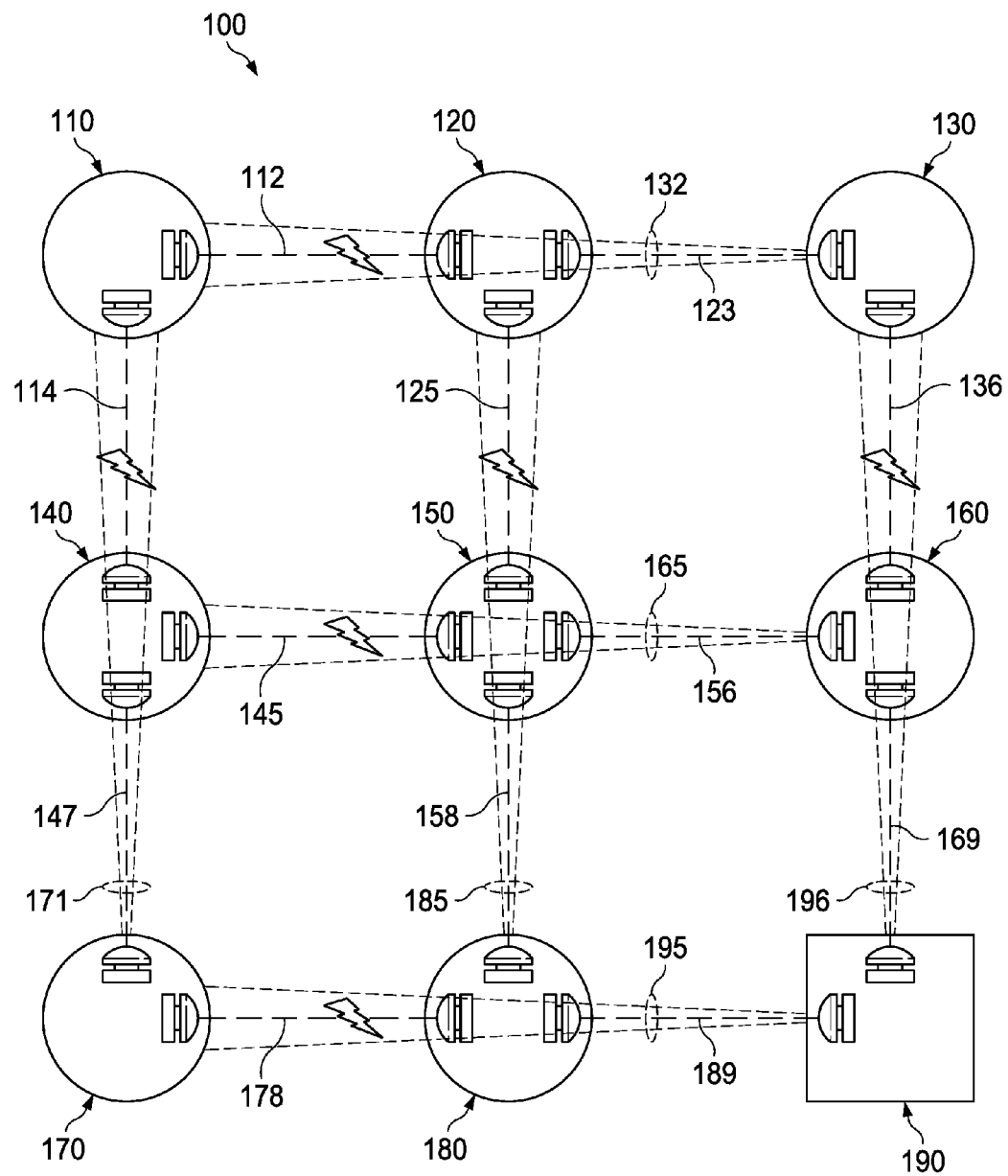

FIGS. 1A-1C illustrate a wireless mesh network 100 that includes access nodes 110-180 and a gateway 190. As used herein, the term "access node" refers to any component (or collection of components) configured to provide direct, or indirect, wireless access to a network, such as wireless access points (e.g., base stations, etc.) and/or repeaters (e.g., relays between an access point and a gateway). As used herein, the term "gateway" refers to any component (or collection of components) that acts as an ingress or egress point to the wireless mesh network, such as Internet gateway. Although the It should be appreciated that the wireless mesh network 100 is depicted as including a single gateway 190 for purposes of clarity and brevity, and that embodiment wireless mesh networks may include multiple gateways distributed over the network topology.

In this example, the access nodes 110-180 are connected with one another, as well as with the gateway 190 via wireless links 112, 114, 123, 125, 136, 145, 147, 156, 158, 169, 178, 189. In particular, the access node 11o is interconnected to the access node 120 via the wireless link 112 and to the access node 140 via the wireless link 114. The access node 120 is interconnected to the access node 130 via the wireless link 123 and to the access node 150 via the wireless link 125. The access node 130 is interconnected to the access node 160 via the wireless link 135, and the access node 140 is interconnected to the access node 150 via the wireless link 145 and to the access node 170 via the wireless link 147. The access node 150 is interconnected to the access node 160 via the wireless link 156 and to the access node 180 via the wireless link 158. The access node 160 is interconnected to the gateway 190 via the wireless link 169, the access node 170 is interconnected to the access node 180 via the wireless link 178, and the access node 180 is interconnected to the gateway 190 via the wireless link 189.

Due to pass through interference, transmissions over the wireless links 112, 114, 123, 125, 136, 145, 147, 156, 158, 169, 178, 189 may interfere with one another. FIG. 1B illustrates how uplink transmissions produce interference in the wireless mess network 100. As shown, an uplink transmission 101 over the wireless link 114 produces interference on the wireless link 147. Similarly, uplink transmissions 102, 104, 105, 106, and 108 over the wireless links 112, 145, 125, 136, and 178 (respectively) produce interference on the wireless links 123, 156, 158, 169, 189 (respectively).

FIG. 1C illustrates how downlink transmissions produce interference in the wireless mess network 100. As shown, a downlink transmission 196 over the wireless link 169 produces interference on the wireless link 136. Similarly, downlink transmissions 195, 185, 171, 165, and 132 over the wireless links 189, 158, 147, 156, and 123 (respectively) produce interference on the wireless links 178, 125, 114, 145, and 112 (respectively).

As mentioned above, it is possible to mitigate inter-link interference in a wireless mesh network by communicating transmissions over links in the wireless mesh network according to a time division multiplexed (TDM) routing schedule. Embodiments of this disclosure provide techniques generating and/or refining the TDM routing schedule according to a Markov chain. In particular, embodiments techniques map wireless links in routes between access nodes and gateway(s) to timeslots of a frame to from synchronized paths through the wireless mess network. Individual synchronized paths are then iteratively added, and removed, from the to a TDM routing schedule by transitioning between states of the Markov chain.

Figure 2:
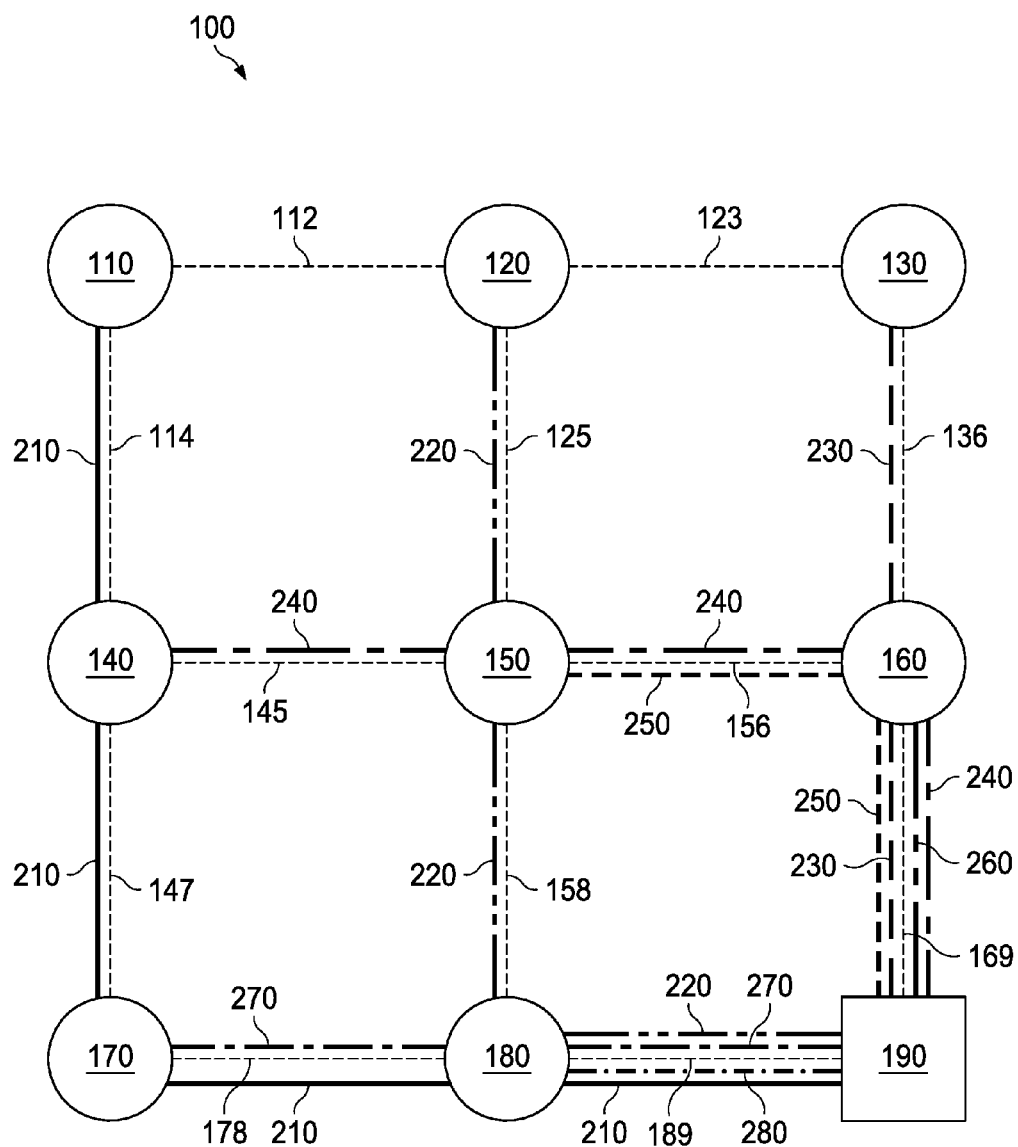
FIG. 2 illustrates a diagram of candidate routes through a wireless mess network 100

FIG. 2 illustrates a diagram of candidate routes 210-280 through the wireless mess network 100. In this example, the candidate route 210 extends from the access node 110 over the wireless links 114, 147, 178, 189 to the gateway 190. The candidate route 220 extends from the access node 120 over the wireless links 125, 158, 189 to the gateway 190. The candidate route 230 extends from the access node 130 over the wireless links 136, 169 to the gateway 190. The candidate route 240 extends from the access node 140 over the wireless links 145, 156, 169 to the gateway 190. The candidate route 250 extends from the access node 150 over the wireless links 156, 169 to the gateway 190. The candidate route 260 extends from the access node 160 over the wireless link 169 to the gateway 190. The candidate route 270 extends from the access node 170 over the wireless links 278, 189 to the gateway 190. The candidate route 280 extends from the access node 180 over the wireless link 189 to the gateway 190.

Figure 3:
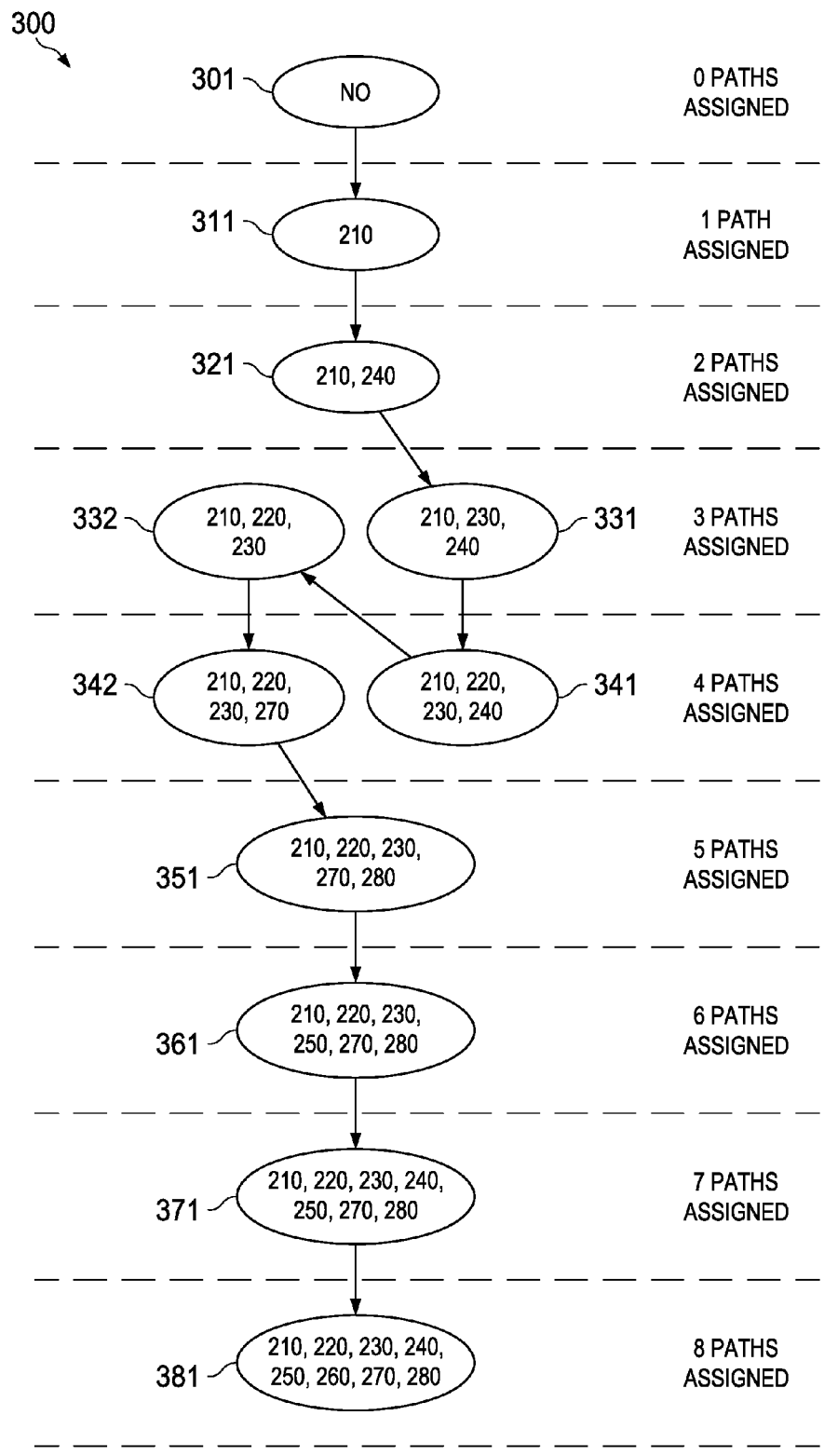
FIG. 3 illustrates a diagram of an embodiment Markov chain progression during generation of a TDM routing schedule for communicating signals over a wireless mesh network.

Embodiments of this disclosure generate and/or refine TDM routing schedule according to a Markov chain. FIG. 3 illustrates a diagram of an embodiment Markov chain progression 300 during which synchronized paths are iteratively added, and removed, from a TDM routing schedule for communicating signals over the wireless mesh network 100. FIGS. 4A-4I illustrate frame configurations associated with different states of the Markov chain progression 300 depicted in FIG. 3. It should be appreciated that although a Markov chain for the all possible combinations of synchronized paths for the routes depicted in FIG. 2 has not been shown for purposes of brevity and concision, examples of Markov chains for smaller wireless mesh networks are shown in FIGS. 7-10.

Figure 4A:
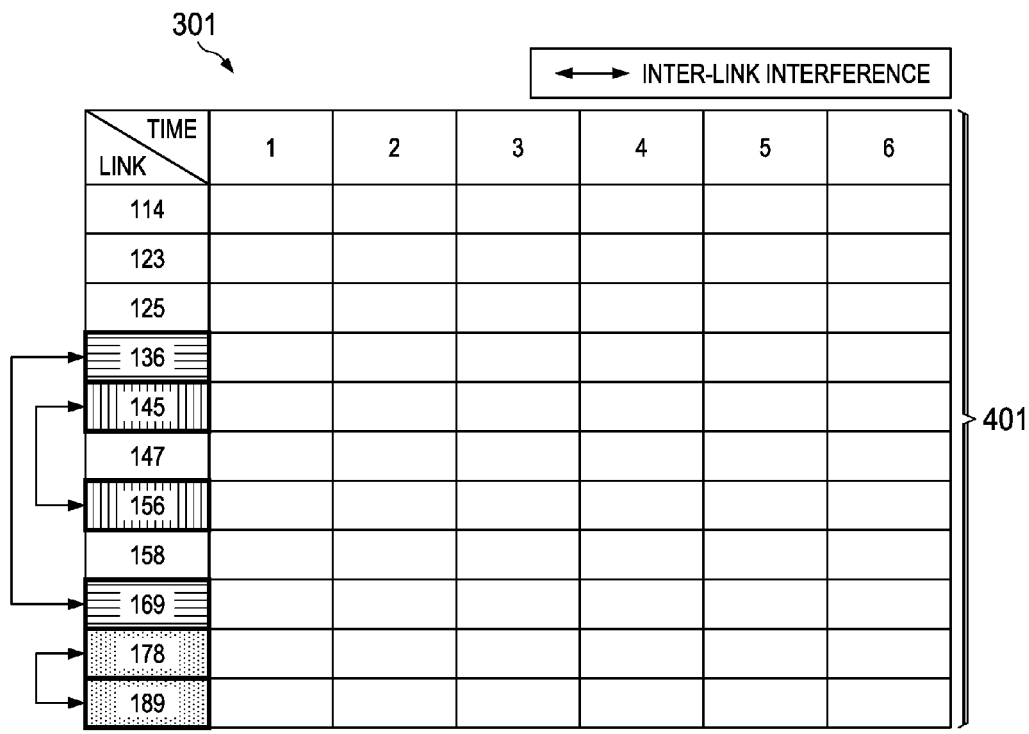
Figure 4B:
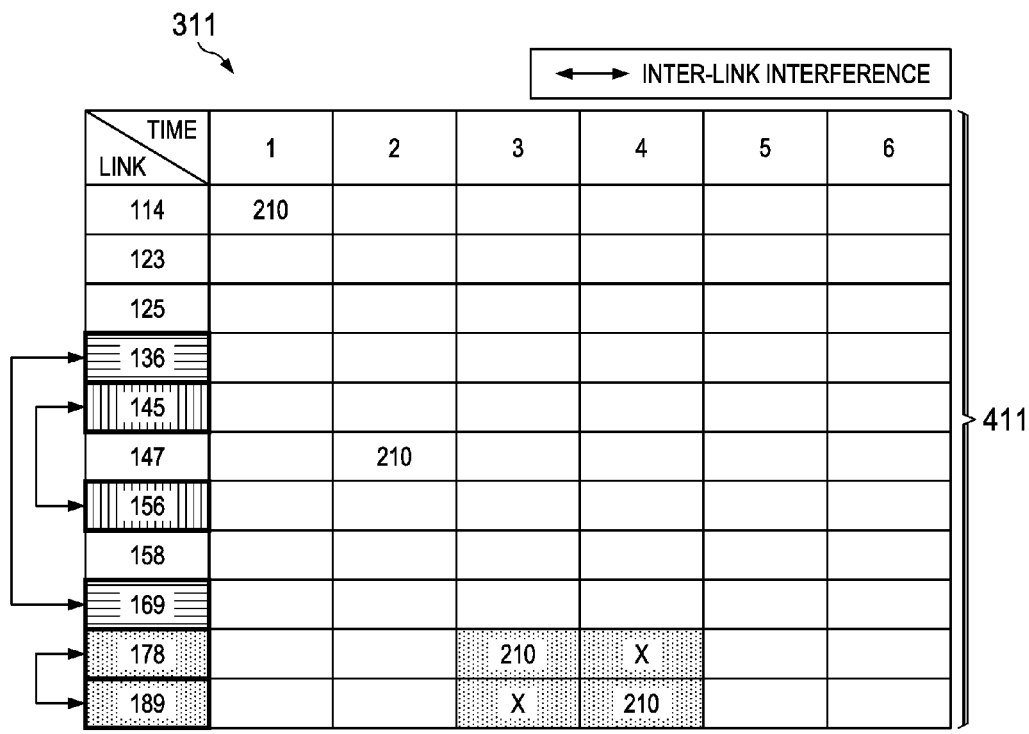

As shown in FIG. 3, the embodiment Markov chain progression 300 begins at state 301 of the Markov chain, where no synchronized paths are assigned to the TDM routing schedule. The resulting frame configuration 401 is depicted in FIG. 4A. Next, the embodiment Markov chain progression 300 proceeds to state 311, where a synchronized path mapping links of the route 210 to timeslots of the frame is added to the TDM routing schedule. A resulting frame configuration 411 associated with the state 311 is depicted in FIG. 4B. As shown, link 114 of the route 210 is mapped to timeslot 1, link 147 of the route 210 is mapped to timeslot 2, link 178 of the route 210 is mapped to timeslot 3, and link 189 of the route 210 is mapped to timeslot 4.

Subsequently, the embodiment Markov chain progression 300 proceeds to state 321, where a synchronized path mapping links of the route 240 to timeslots of the frame is added to the TDM routing schedule. A resulting frame configuration 421 associated with the state 321 is depicted in FIG. 4C. As shown, link 145 of the route 240 is mapped to timeslot 2, link 156 of the route 240 is mapped to timeslot 3, and link 169 of the route 240 is mapped to timeslot 4.

Thereafter, the embodiment Markov chain progression 300 proceeds to state 331, where a synchronized path mapping links of the route 230 to timeslots of the frame is added to the TDM routing schedule. A resulting frame configuration 431 associated with the state 331 is depicted in FIG. 4D. As shown, link 136 of the route 230 is mapped to timeslot 1, and link 169 of the route 230 is mapped to timeslot 2.

Next, the embodiment Markov chain progression 300 proceeds to state 341, where a synchronized path mapping links of the route 220 to timeslots of the frame is added to the TDM routing schedule. A resulting frame configuration 441 associated with the state 341 is depicted in FIG. 4E. As shown, link 125 of the route 220 is mapped to timeslot 3, link 158 of the route 220 is mapped to timeslot 4, and link 189 of the route 220 is mapped to timeslot 5.

Next, the embodiment Markov chain progression 300 proceeds to state 332, where the synchronized path for the route 240 that was added in state 321 is removed. As shown in FIG. 4F, the resulting frame configuration 432 includes the synchronized paths for the routes 210, 220, and 230 that were added in states 311, 331, and 341 (respectively), and excludes the synchronized path for the route 240 added in state 321. Removing/releasing synchronized paths in this manner may allow the iterative technique to avoid local maximums and ultimately generate TDM routing schedules that achieve higher performance.

Subsequently, the embodiment Markov chain progression 300 proceeds to state 342, where a synchronized path mapping links of the route 270 to timeslots of the frame is added to the TDM routing schedule. A resulting frame configuration 442 associated with the state 342 is depicted in FIG. 4G. As shown, link 178 of the route 270 is mapped to timeslot 1, and link 189 of the route 270 is mapped to timeslot 2.

Thereafter, the embodiment Markov chain progression 300 proceeds to state 351, where a synchronized path mapping links of the route 280 to timeslots of the frame is added to the TDM routing schedule. A resulting frame configuration 451 associated with the state 351 is depicted in FIG. 4H. As shown, link 189 of the route 280 is mapped to timeslot 6.

Next, the embodiment Markov chain progression 300 proceeds to state 361, where a synchronized path mapping links of the route 250 to timeslots of the frame is added to the TDM routing schedule. A resulting frame configuration 461 associated with the state 361 is depicted in FIG. 4I. As shown, link 156 of the route 250 is mapped to timeslot 4, and link 169 of the route 250 is mapped to timeslot 5.

Subsequently, the embodiment Markov chain progression 300 proceeds to state 371, where a synchronized path mapping links of the route 240 to timeslots of the frame is added to the TDM routing schedule. A resulting frame configuration 471 associated with the state 371 is depicted in FIG. 4J. Notably, state 371 maps the links of the route 240 to different timeslots than the state 321. In particular, link 145 of the route 240 is mapped to timeslot 1, link 156 of the route 240 is mapped to timeslot 2, and link 169 of the route 240 is mapped to timeslot 3.

Finally, the embodiment Markov chain progression 300 proceeds to state 381, where a synchronized path mapping links of the route 260 to timeslots of the frame is added to the TDM routing schedule. A resulting frame configuration 481 associated with the state 381 is depicted in FIG. 4K.

FIGS. 5A-5H illustrate diagrams of how packets are communicated over the wireless mesh network 100 according to the synchronized paths defined by the frame configuration 481 depicted in FIG. 4K.

Figure 5A:
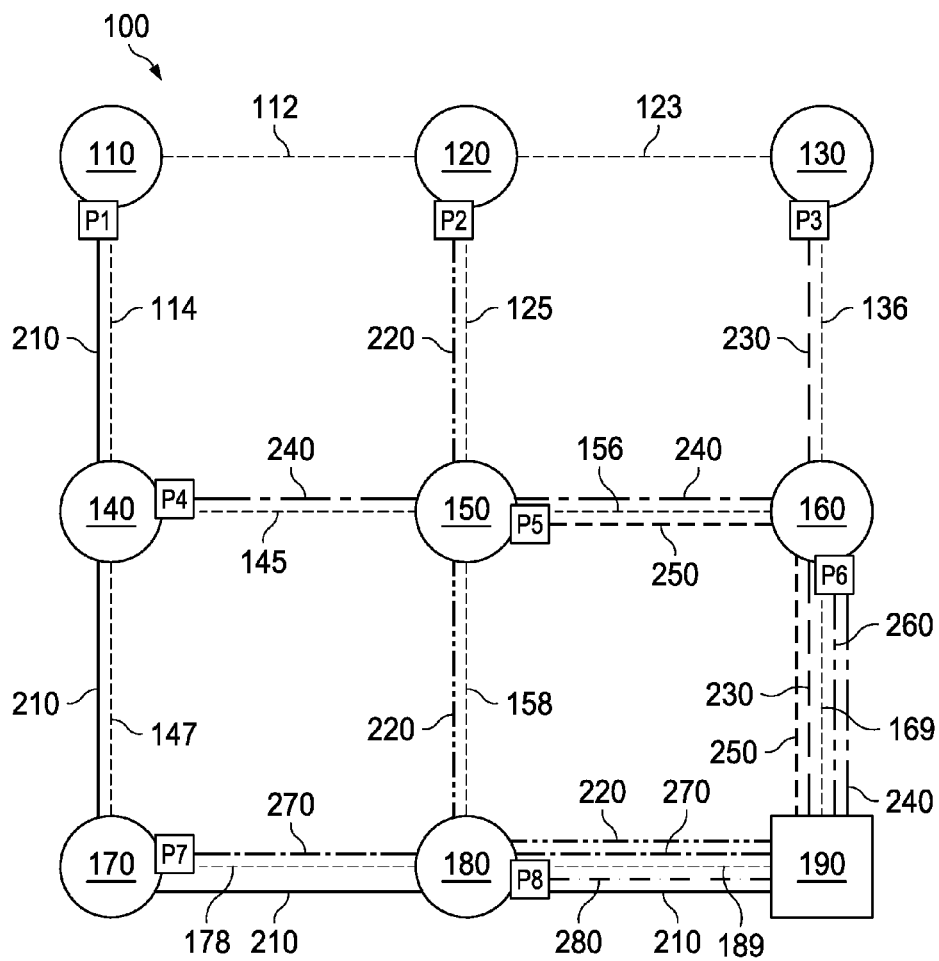
FIGS. 5A-5H illustrate diagrams of how packets are communicated over a wireless mesh network according to the frame configuration depicted in FIG. 4K.

As shown in FIG. 5A, the access nodes 110, 120, 130, 140, 150, 160, 170, 180 have packets P1, P2, P3, P4, P5, P6, P7, P8 (respectively) to be communicated to the gateway 190 over synchronized paths defined by the frame configuration 481. FIGS. 5B-5G illustrate how the packets P1, P2, P3, P4, P5, P6, P7, P8 are communicated over routes 210, 220, 230, 240, 250, 260, 270, 280 (respectively) during each timeslot of the frame configuration 481.

Figure 5B:
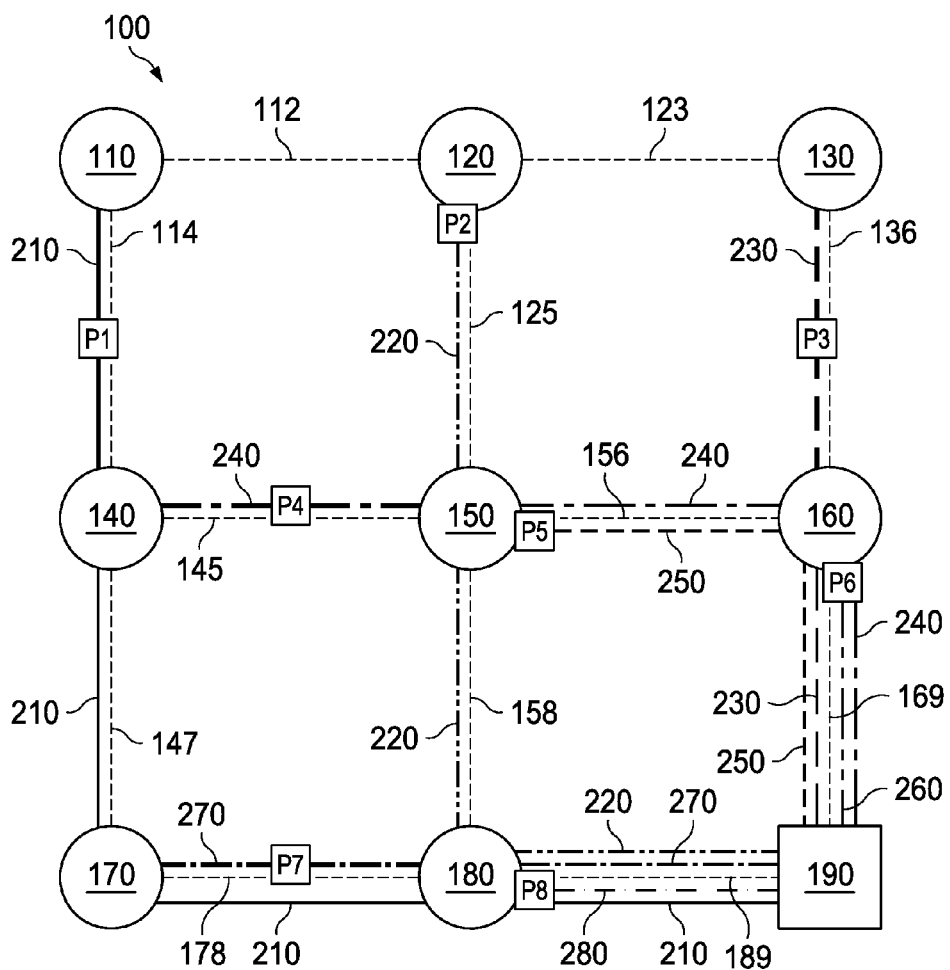

In particular, FIG. 5B illustrates how packets P1, P3, P4, and P7 are forwarded over corresponding hops of the routes 210, 230, 240, and 270 (respectively) during the first timeslot of the frame configuration 481. As shown, the packet P1 is communicated over the link 114, the packet P3 is communicated over the link 136, the packet P4 is communicated over the link 145, and the packet P7 is communicated over the link 178.

Figure 5C:
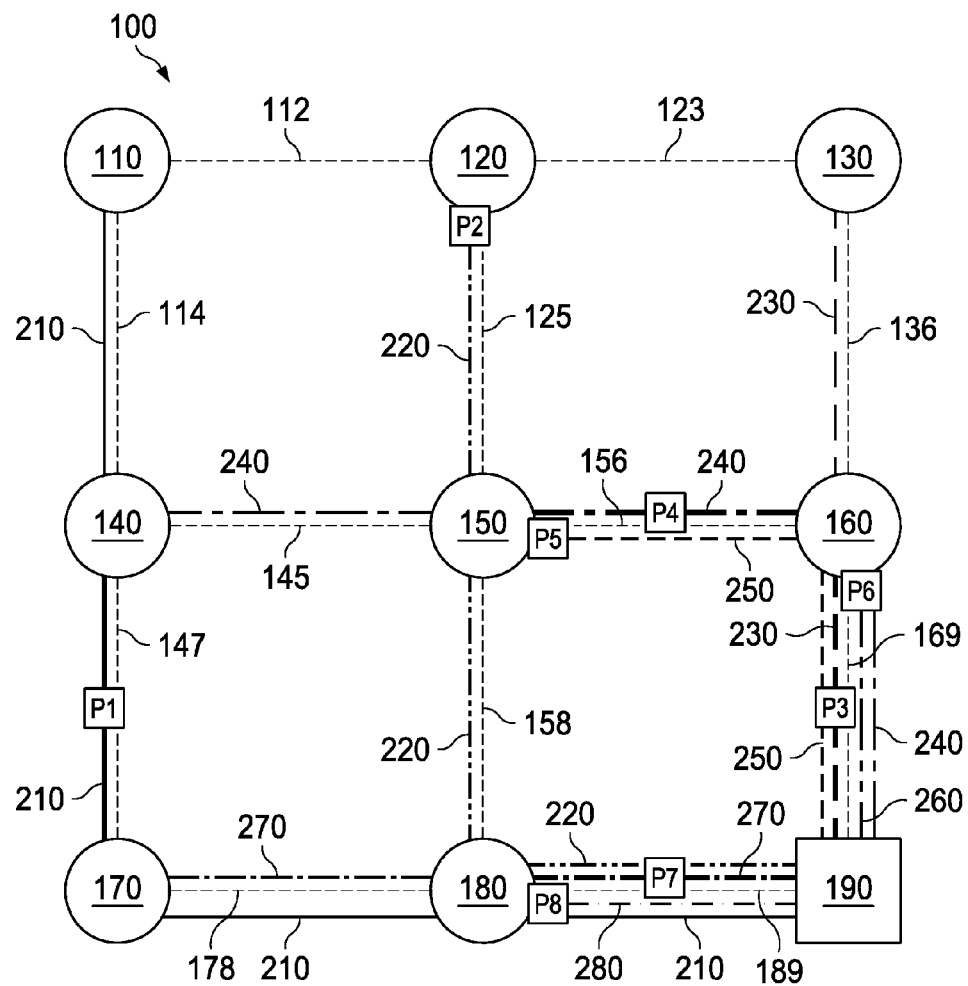

FIG. 5C illustrates how packets P1, P3, P4, and P7 are forwarded over corresponding hops of the routes 210, 230, 240, and 270 (respectively) during the second timeslot of the frame configuration 481. As shown, the packet P1 is communicated over the link 147, the packet P3 is communicated over the link 169, the packet P4 is communicated over the link 156, and the packet P7 is communicated over the link 189.

Figure 5D:
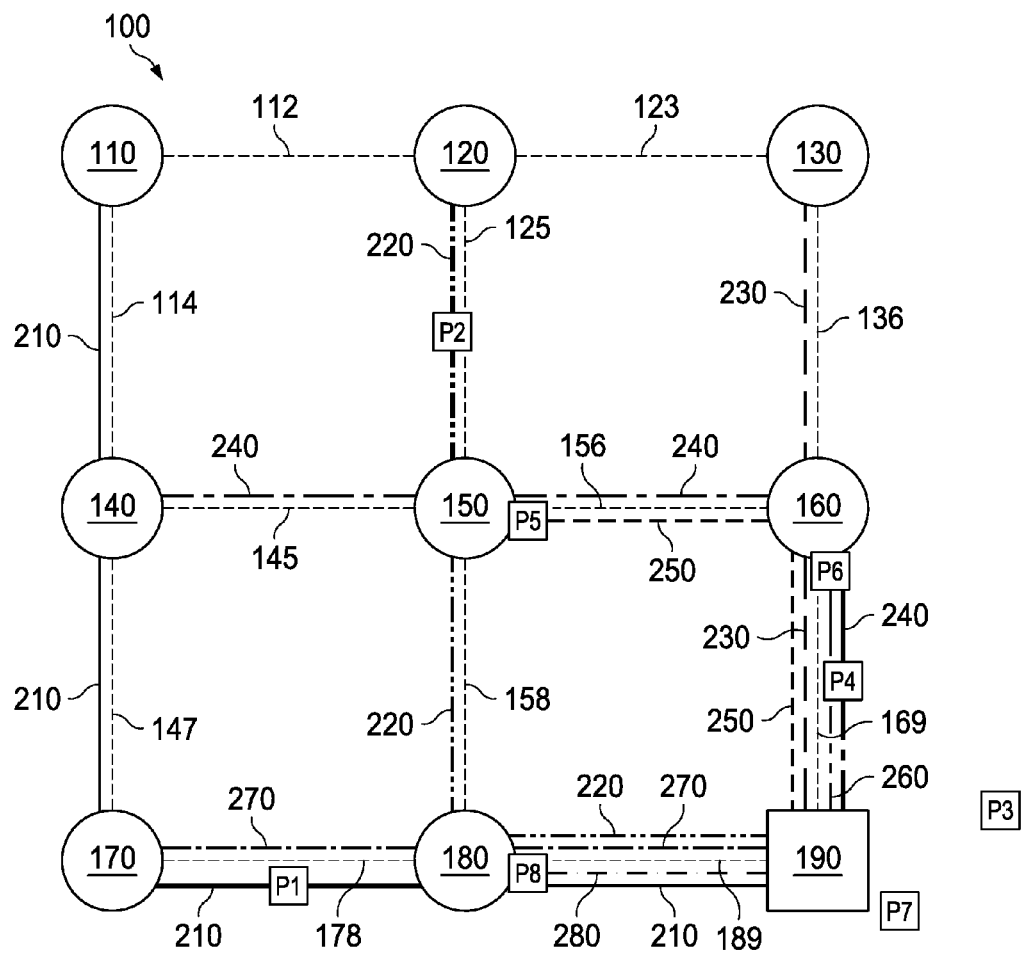

FIG. 5D illustrates how packets P1, P2, and P4 are forwarded over corresponding hops of the routes 210, 220, and 240 (respectively) during the third timeslot of the frame configuration 481. As shown, the packet P1 is communicated over the link 178, the packet P2 is communicated over the link 125, and the packet P4 is communicated over the link 169.

Figure 5E:
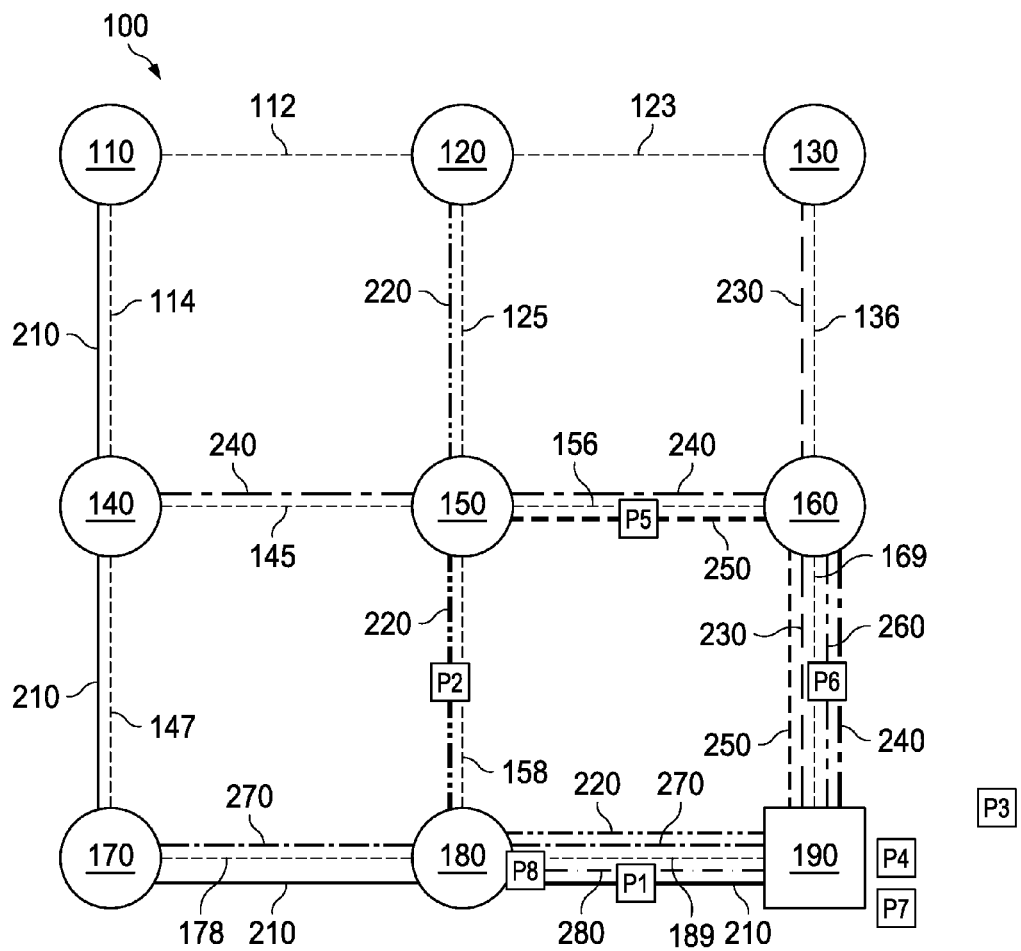

FIG. 5E illustrates how packets P1, P2, P5, and P6 are forwarded over corresponding hops of the routes 210, 220, 250, and 260 (respectively) during the fourth timeslot of the frame configuration 481. As shown, the packet P1 is communicated over the link 189, the packet P2 is communicated over the link 158, the packet P5 is communicated over the link 156, the packet P6 is communicated over the link 169.

Figure 5F:
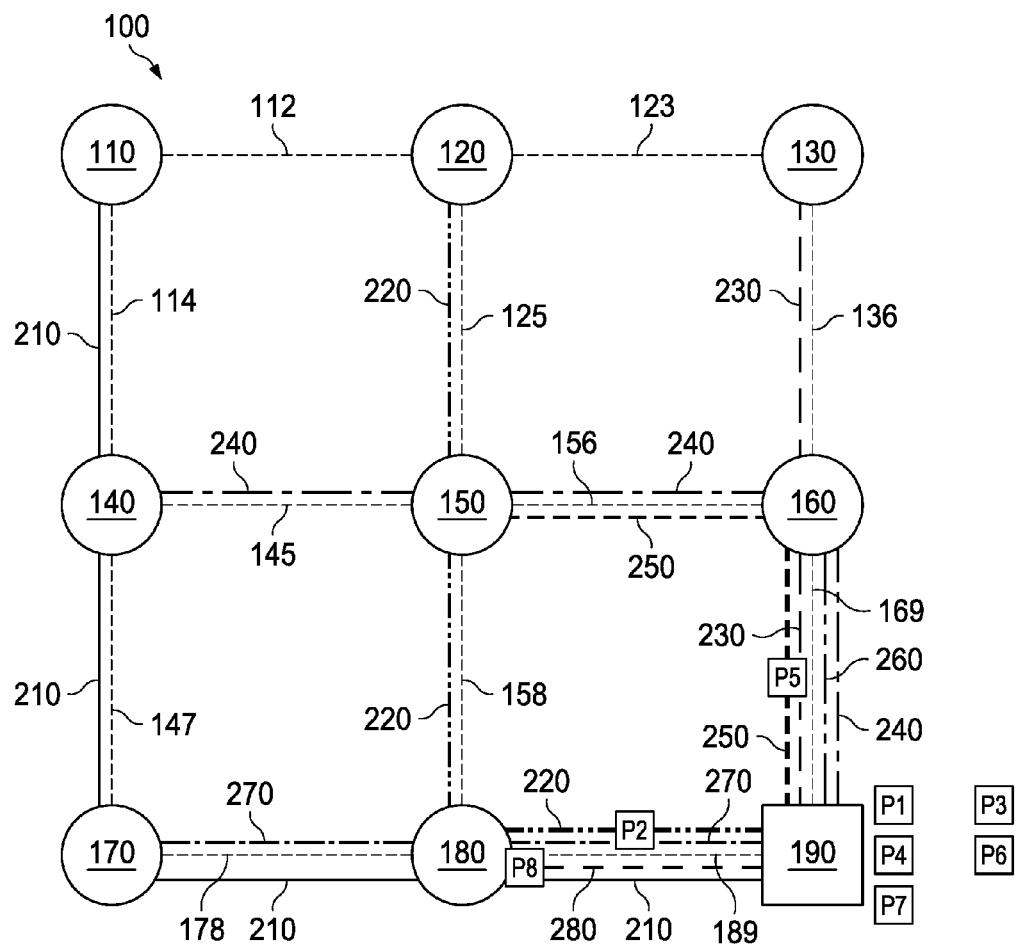

FIG. 5F illustrates how packets P2 and P5 are forwarded over corresponding hops of the routes 220 and 250 (respectively) during the fifth timeslot of the frame configuration 481. As shown, the packet P2 is communicated over the link 189, and the packet P5 is communicated over the link 169.

Figure 5G:
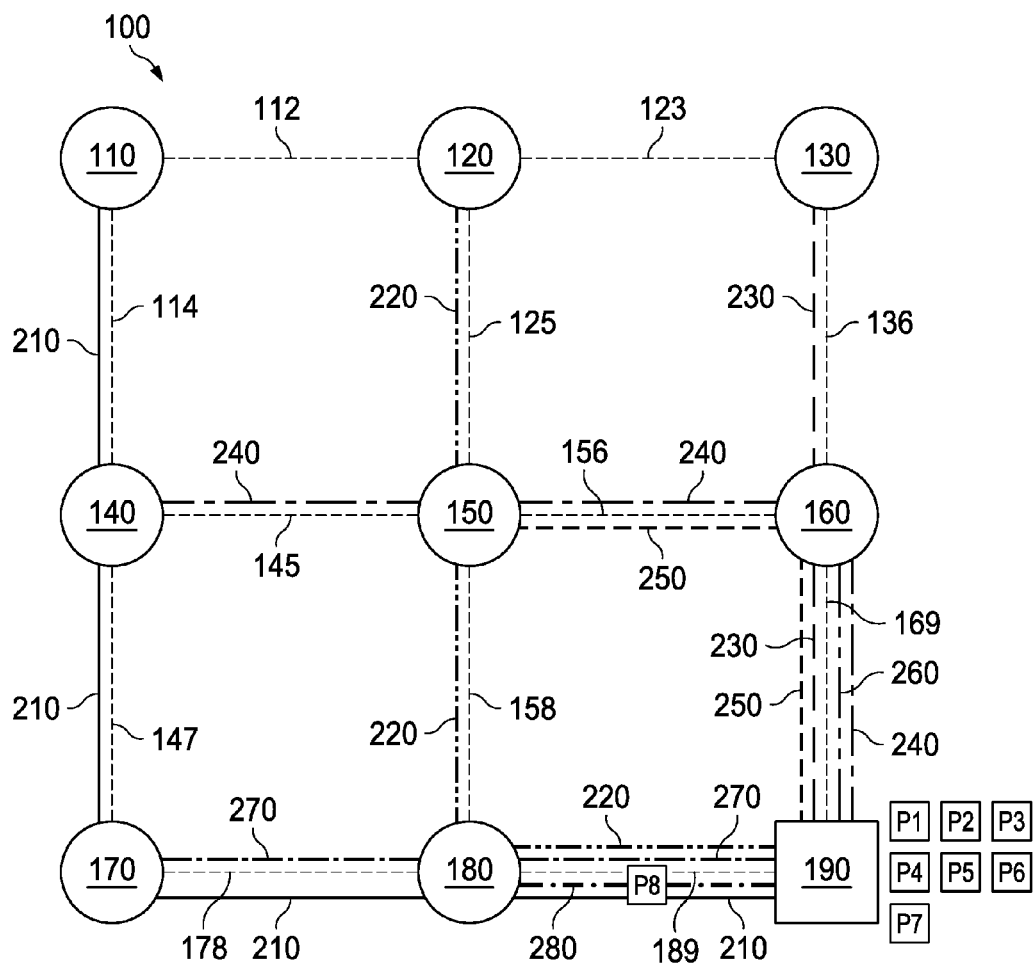
Figure 5H:
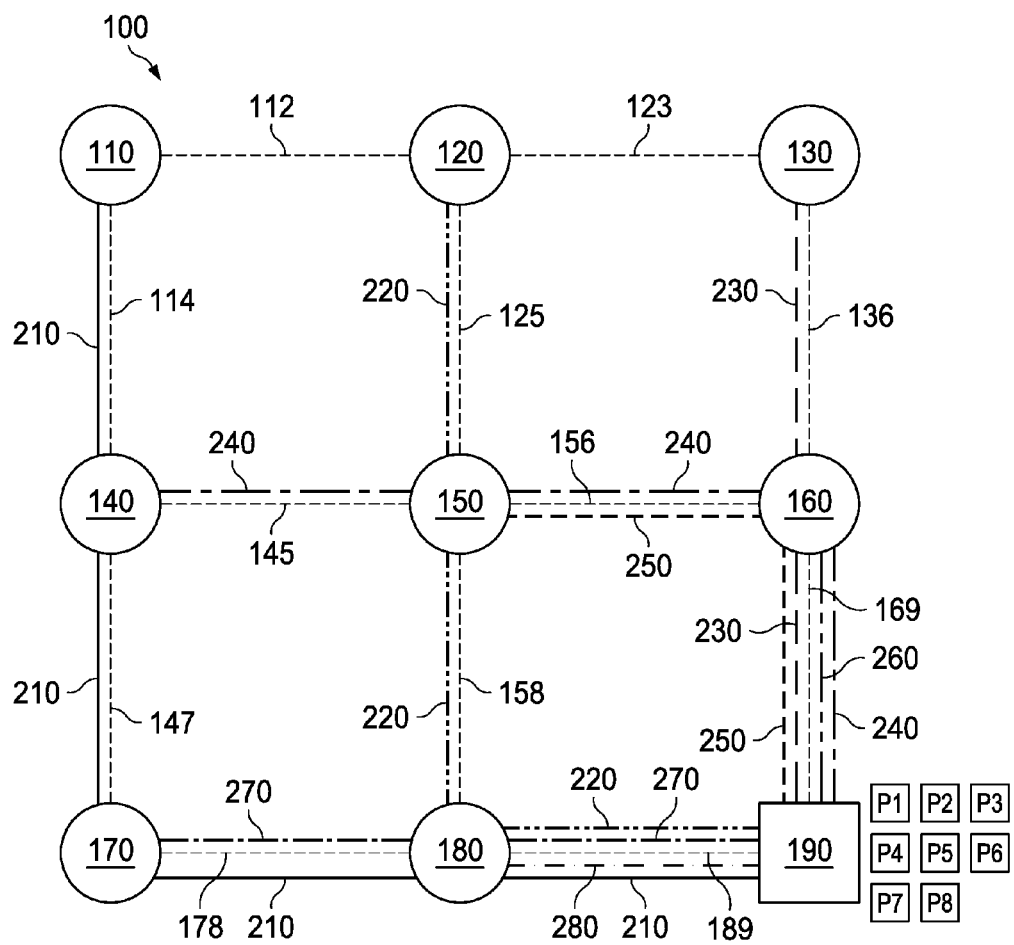

FIG. 5G illustrates how the packet P8 is forwarded link 189 of the route 280 during the sixth timeslot of the frame configuration 481. As shown in FIG. 5H, each of the packets have been received by the gateway 190 after the sixth timeslot of the frame configuration 481.

Figure 6:
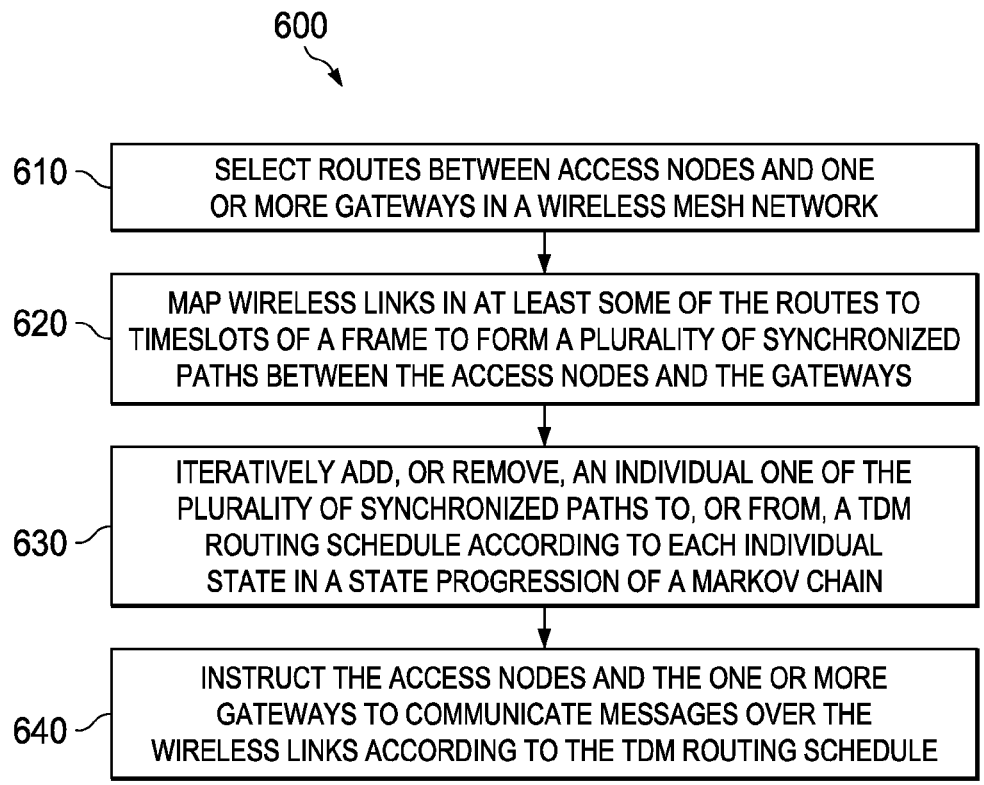
FIG. 6 illustrates a flowchart of an embodiment method for generating a TDM routing schedule according to a Markov chain progression.

FIG. 6 illustrates a flowchart of an embodiment method 600 for generating a TDM routing schedule for a wireless mesh network according to a Markov chain, as may be performed by a controller. As shown, the embodiment method 600 begins at step 610, where the controller selects routes between access nodes and one or more gateways in a wireless mesh network. Each of the routes has one or more wireless links. At step 620, the controller maps wireless links in at least some of the routes to timeslots of a frame to form a plurality of synchronized paths between the access nodes and the gateways. At step 630, the controller iteratively adds, or removes, an individual one of the plurality of synchronized paths to, or from, a TDM routing schedule according to each individual state in a state progression of a Markov chain. As explained above, each state of the Markov chain maps a different combination of synchronized paths to the TDM routing schedule. At step 640, the controller instructs the access nodes and the one or more gateways to communicate messages over the wireless links according the TDM routing schedule.

Figure 7:
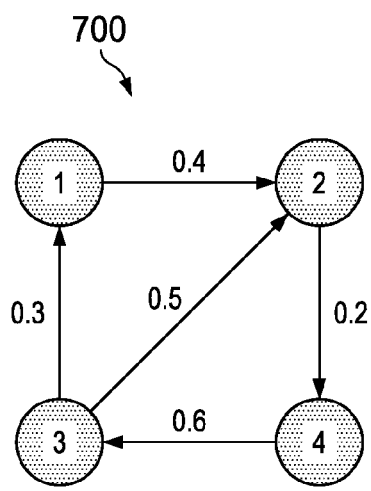
FIG. 7 illustrates a diagram of a Markov chain.

As discussed above, embodiments of this disclosure configure a TDM routing schedule for a wireless mesh network based on a Markov chain. A Markov chain is technique for modeling a random process that undergoes transitions between states in a state space. Markov chains are memoryless states machines, meaning that the probability of progressing to the next state depends only on the current state. FIG. 7 illustrates a diagram of a Markov chain 700. The variable X is used to denote the current state, and the transition probability of going from state i to state j in a single time step is $p_{ij}$. In this example, $X \in \{1, 2, 3, 4\}$ and $$P = [p_{ij}] = \begin{bmatrix} 0.6 & 0.4 & 0 & 0 \\ 0 & 0.8 & 0 & 0.2 \\ 0.3 & 0.5 & 0.2 & 0 \\ 0 & 0 & 0.6 & 0.4 \end{bmatrix}.$$

If the state transition probabilities are constant, then the different states have steady state probabilities (aka stationary distribution), and then the steady state probabilities ($\pi$) can found by computing $P^n$ as n goes to infinity. In this example, the steady state probabilities would be as follows:

$$\pi = \lim_{n \to \infty} P^n = \begin{bmatrix} 0.106 & 0.565 & 0.141 & 0.188 \\ 0.106 & 0.565 & 0.141 & 0.188 \\ 0.106 & 0.565 & 0.141 & 0.188 \\ 0.106 & 0.565 & 0.141 & 0.188 \end{bmatrix} =$$

$$[0.106 \quad 0.565 \quad 0.141 \quad 0.188].$$

Figure 8:
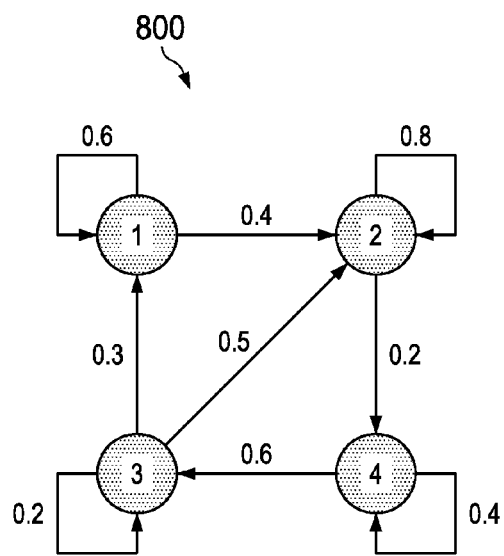
FIG. 8 illustrates a diagram of an irreducible Markov chain.
Figure 9:
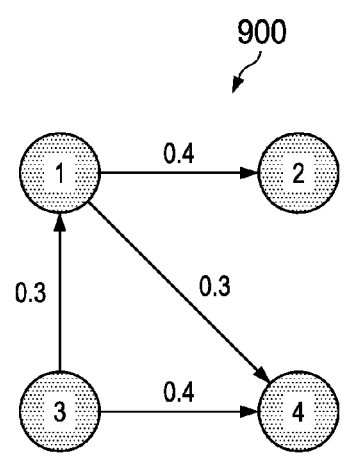
FIG. 9 illustrates a diagram of a reducible Markov chain.

Markov chains can be either reducible or irreducible. In an irreducible Markov chain, it is possible to get to any state from any state. FIG. 8 illustrates a diagram of an irreducible Markov chain 800. As shown, all states in the irreducible Markov chain 700 are recurrent, meaning that given sufficient time, a state progression will eventually return to each state. A state is positive recurrent if it's mean recurrence time is finite, e.g., a random walk on the set of integers (+1, −1) with probability 0.5 is a null-recurrent Markov chain. In a reducible Markov chain, it is not possible to get to any state from any state. FIG. 9 illustrates a diagram of a reducible Markov chain 900. As shown, states 1 and 3 are transient, meaning that the progression does not return to theses states after leaving them.

Figure 10:
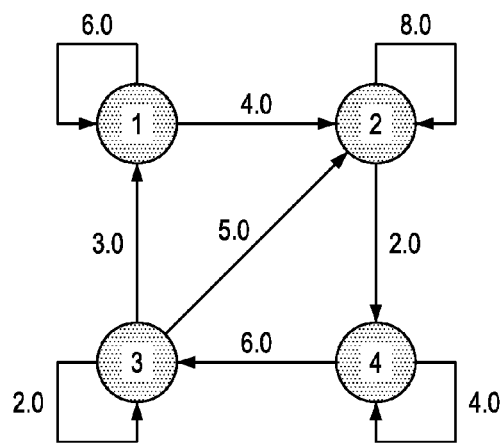
FIG. 10 illustrates a diagram of a continuous time Markov chain.

In a continuous time Markov chain, the probabilities of the equivalent finite state Markov chain are converted into a length of time that the progression spends in the given state space. FIG. 10 illustrates a diagram of a continuous time Markov chain 900. In the continuous time Markov chain 1000, each transition has a rate (qj) and associated with it. A clock is attached to each transition, and the time until the clock expires is an exponential random variable ($t_j$) that is a function of the rate (qj) associated with the transition. The time spent in a given state is associated with another random variable (T) with rate (v), where $v=q_1+q_2+q_3+\ldots q_N$. From this, the probability that the next state is state j may be determined according to the following formula: $p_j=q_j/v$.

Figure 11:
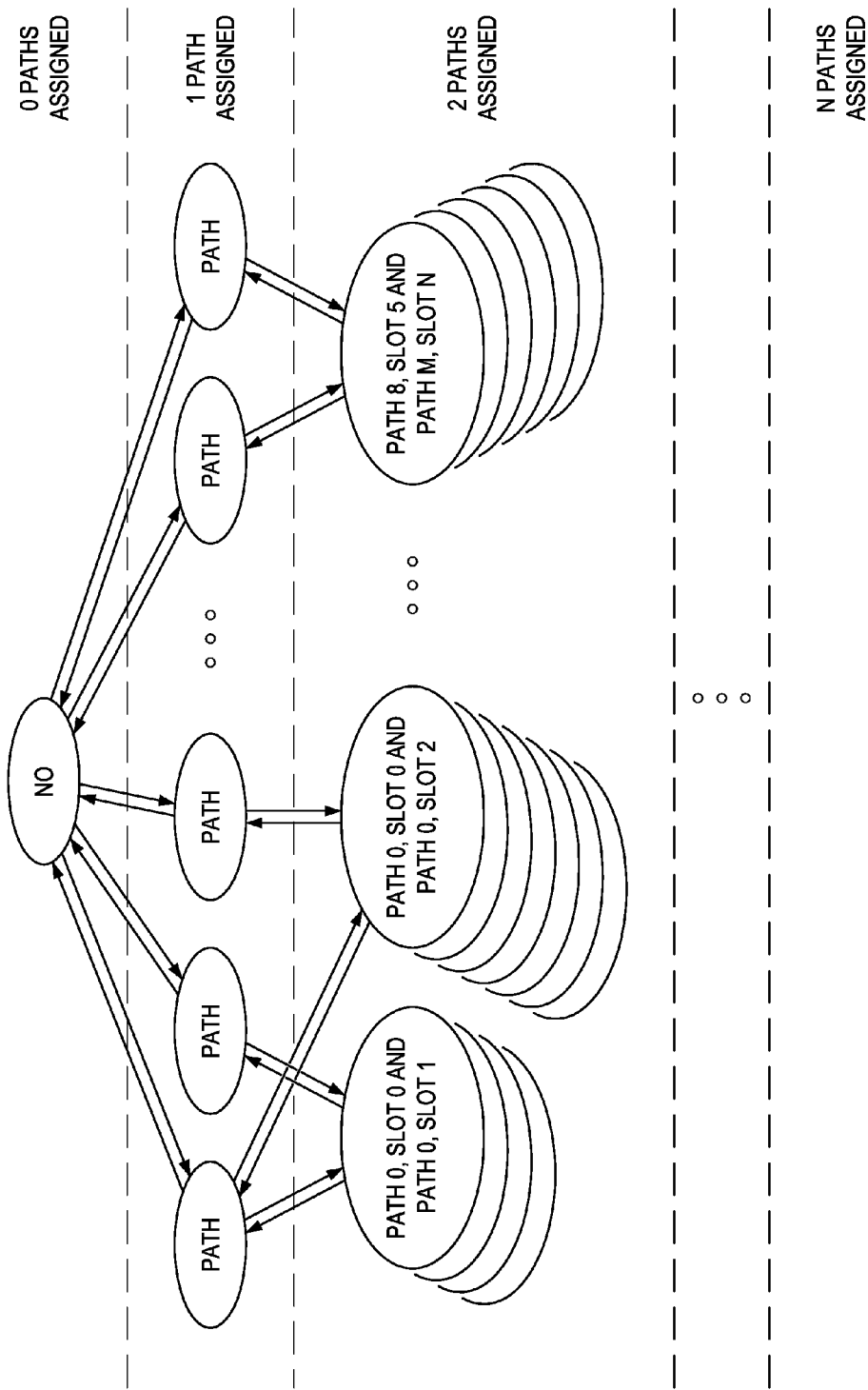
FIG. 11 illustrates a diagram of a Markov chain progression for an N-path mesh network optimization problem

FIG. 11 illustrates a diagram of a Markov chain progression for an N-path mesh network optimization problem. As shown, the optimization problem becomes more complex when as the number of synchronized paths is increased.

Figure 12:
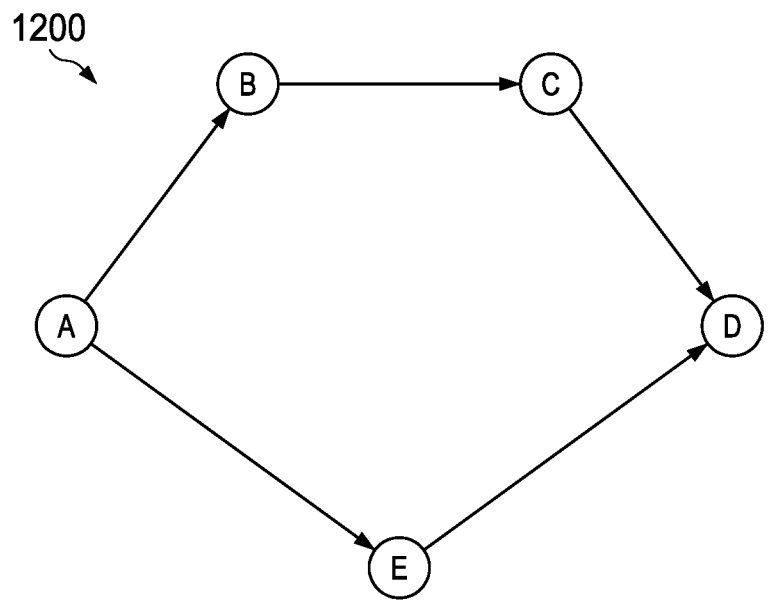
FIG. 12 illustrates a diagram of a network for communicating traffic flows between nodes.
Figure 13:
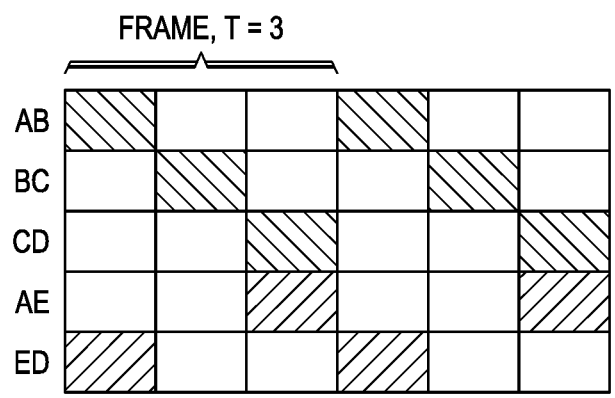
FIG. 13 illustrates a diagram of a TDM schedule for communicating traffic over physical paths of the network depicted in FIG. 12.

FIG. 12 illustrates a network for communicating traffic flows from node A to node D. There are two physical paths for communicating traffic from A to D, namely the path ABCD and the path AED. FIG. 13 illustrates a TDM schedule for communicating traffic over physical paths of the network 1200. The time axis is divided into two frames each of which include three time-slots. In the first slot the links AB and ED are active. In the second slot, the link BC is active. In the third slot, the links CD and AE are active. Later frames are identical, and this cycle of transmissions achieves the maximal throughput from A to D of 2/3 of the link capacity (i.e. two slots of traffic per three slots of time elapsed). This network is essentially a circuit-switched network. An element of the network is j=(i, t) where i∈I labels the physical link and t∈T labels the slot within a frame: here T={1, 2, ..., T} and T is the frame length. Thus j∈J=I×T. A path through the network is a set, r, of elements which allows data to be transported from a source to a destination. A first path through the network 1200 is $r_1$={(AB,1), (BC,2), (CD,3)}. A second path through the network is $r_2$={(AB,2), (BC,3), (CD,1)}. The first path is compatible (e.g., can coexist) with a third path $r_3$={(AE,3), (ED, 1)}, while the second path ($r_2$) is not compatible with the third path ($r_3$). Together, the paths ($r_1$, $r_3$) achieve a throughput from node A to node E of 2/3, or two slots of traffic for every three slots of elapsed time.

Figure 14:
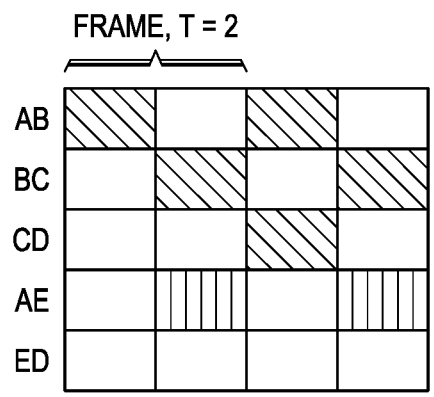
FIG. 14 illustrates a diagram of another TDM schedule for communicating traffic over physical paths of the network depicted in FIG. 12.

In some examples, there may also be traffic from node A to node E. FIG. 14 illustrates a TDM schedule for communicating traffic over a physical path ABCD and AE of the network 1200. As shown, a fourth path through the network is $r_4$={(AE,2)}.

Then ($r_1$, $r_3$, $r_4$) can coexist, and this triple achieves a throughput of 1/3 from A to E as well as the throughput of 2/3 from A to D. If the relative throughputs required were different, then a different frame length than T=3 might well be desirable. For example, a frame length of T=2 allows a throughput of 1/2 from A to E and of 1/2 from A to D.

By making the frame length arbitrarily long, it is possible to approach any convex combination of the two solutions. More generally, for any network, the capacity (or rate) region will approach a convex region as the frame length becomes larger and larger.

Consider the following example, where $n_r$=1 if a synchronized path is currently set up along a route r∈R, and $n_r$=0 otherwise. Here R is the set of possible paths (many of which conflict with each other). Define the vector n=($n_r$, r∈R). Write that the state n is feasible if the SINR inequalities are simultaneously satisfied for all of the paths in n, that is all paths r with $n_r$=1. Let N be the set of feasible states. It is a subset of $\{0,1\}^R$ with the following hierarchical property: if $e_r$ is the state describing one path on route r, then n+$e_r$∈N n∈N.

Let S be the set of access points, S, say, in total. Let H, the flow composition matrix, be the incidence matrix identifying which paths serve which access points: i.e. $H_{sr}$=1 if path r serves access point s, and $H_{sr}$=0 otherwise. (Column sums of H are 1, i.e. each path has a single access point that it serves. Let s(r) be that access point for path r.) The aggregate throughput $x_s$ for an access point s is the sum of the paths serving it:

$$x_s = \sum_{r \in R} H_{sr} n_r,$$

s∈S., which may also be written as x=Hn.

A proportionally fair allocation of capacity may be given by maximizing:

$$\sum_{s \in S} d_s \log x_s$$

subject to x=Hn over n∈N. (1).

It is possible to determine the rough complexity of this approach. Consider a set of routes R. For each access point s∈S, suppose there are constructed one or more physical paths to a gateway. In some examples, the paths are the shortest paths through the physical network to gateways if the shortest physical path is not unique. In some examples, the paths include a node-disjoint physical path to a gateway. Each physical path has associated with it T synchronized paths. So there are of order O(ST) paths in the set R. The set N is of vastly larger size—it's a subset of $\{0,1\}^R$ and may grow exponentially with the number of access points S.

Figure 15:
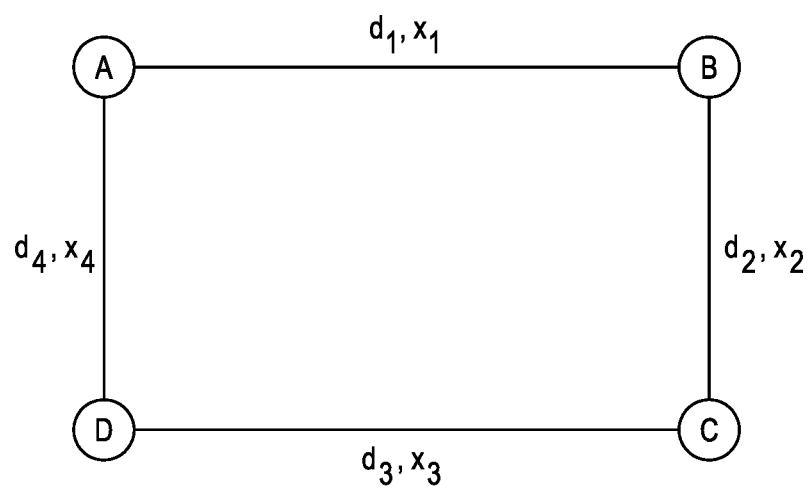
FIG. 15 illustrates a diagram of another network for communicating traffic flows between nodes.

FIG. 15 illustrates another example of a network. There are four links, each of equal capacity and each carrying one hop traffic between its endpoints. Transmission and reception from a node cannot take place simultaneously. Thus if T=1 there are two maximal cliques: either the links AB and CD are active, or the links BC and DA are active. Consider the above routing strategy operating with Poisson arrivals and random departures of end-users for each of the links. Let $d_r$, r=1, 2, 3, 4 be the number of end-users at links AB, BC, CA, AD, respectively. Then $d_r$, r=1, 2, 3, 4 evolve over time, but at a fixed point in time they are independent Poisson random variables.

If T≥1 then the number of maximal cliques is $2^T$. We know this, but Algorithm 1 that we are about to describe does not. Algorithm 1 On an arrival of a new end-user, say an increase of $d_1$ by 1, the corresponding link AB looks through the T paths (AB, t), t=1, 2, ..., T in a random order to see if one is available: if it finds one it grabs it. Whether it can find one or not it shares all the paths it has set up over the $d_1$+1 end-users it now has. On the departure of an end-user, say a decrease of $d_1$ by 1, the corresponding link AB looks to see if it has $d_1$+1 paths set up: if it has, it clears down the oldest of these paths. Similarly for links 2, 3 and 4.

Algorithm 2: Suppose the algorithm is aware of the set of maximal cliques, and so does the following variation. On an increase of $d_1$ by 1, the link AB looks through the T paths (AB, t), t=1, 2, ..., T in that order for a new available path. The link CD behaves similarly. The link BC looks through its T paths in the reverse order (BC, t), t=T, ..., 2, 1, and the link DA behaves similarly. When a link clears down a path it chooses the most recently set up of its paths in use. Thus the paths in use by a link will be in contiguous time slots, from 1 upwards for links AB and CD and from T downwards for links BC and DA.

Recall that the number of end-users, $d_r$, r=1, 2, 3, 4, are independent Poisson random variables with means of say $\lambda_r$, r=1, 2, 3, 4 respectively. Let $X_r$, r=1, 2, 3, 4 be the number of paths set up to carry the traffic of these end-users. (Both $X_r$ and $d_r$ are values of a stochastic process observed at a point in time.)

Algorithm 3. As with Algorithm 1, setup 1 path from every access node to a network gateway. This time, we don't use attach/detach as a trigger. Instead every access node establishes a new path at the rate $\gamma\, e^{\theta_s}$ (3) where the parameter $\theta_s$ is given by:

$$\theta_s = \beta \frac{d_s}{X_s}$$

We release paths at a constant rate $\gamma$. We can release the oldest path using this approach. In this algorithm $\gamma$ controls the rate at which paths are setup and cleared, so $\gamma$ is controlling the rate at which the system evolves. The parameter $\theta_r$ is controlling the rate at which individual access nodes try to setup requests. Since $\theta_r$ is based on the ratio of the number of users at an access point to the number of paths at an access point, the setup rate will try and increase when an access point has a bandwidth deficit and decrease when an access point has a bandwidth surplus.

Regarding Markov Approximation. Consider that $N \subset \{0, 1\}^R$ is the set of feasible states. Let n be a Markov process with state space N and transition rates $2q(n,n-e_r)=\gamma$ if $n_r=1$, (4); $q(n,n+e_r)=\gamma \exp(\theta_{s(r)})$ if $n+e_r \in N$, (5) for $r \in R$, where $e_r \in N$ is a unit vector with a 1 as its r th component and 0s elsewhere. When $n_r=1$, a synchronized path r is currently set up for the given route: it remains set up for a time that is exponentially distributed with parameter $\gamma$. Thus the first path serving access point s to clear down does so after an exponentially distributed time with parameter $\gamma m_s$ where $$m_s = \sum_{r \in R} H_{sr} n_r,$$

the number of paths set up that are serving access point s. (The results remain the same if every path that is set up clears down after a fixed length of time $\gamma^{-1}$.)

If $n_r=0$, and it is feasible to set up the path r without violating SINR inequalities for existing paths, then path r is set up at rate $\gamma \exp(\theta_{s(r)})$, for each path $r \in R$. (Recall s(r) is the access point served by path r.) Thus the rate at which paths are set up for access point s is $k_s \gamma \exp(\theta_s)$ where $k_s$ counts the number of paths in the set $\{r \in R: H_{sr}=1$ and $n+e_r \in N\}$, i.e. the number of paths serving access point s that are individually system feasible to add to n.

The equilibrium distribution for $n=(n_r, r \in R)$ can be written in the form:

$$\pi_\theta(n) = \frac{\exp\left(\sum_{r \in R} \theta_{s(r)} n_r\right)}{\sum_{n' \in N} \exp\left(\sum_{r \in R} \theta_{s(r)} n_r\right)},$$

$n \in N$. (6). This follows, since $(\pi_\theta(n), n \in N)$ is a probability distribution and it satisfies the detailed balance condition $\pi_\theta(n)q(n, n+e_r)=\pi_\theta(n+e_r)q(n+e_r, n)$. The expected number of paths set up that serve access point s is then $$E_\theta\left[\sum_{r \in R} H_{sr} n_r\right] = \sum_{n \in N} \pi_\theta(n) \sum_{r \in R} H_{sr} n_r,$$

$s \in S$ or in matrix form $$\sum_{n \in N} \pi_\theta(n) H n.$$

Formulating the optimization problem. Consider the optimization problem maximize $$\sum_{s \in S} d_s \log x_s - \sum_{n \in N} p(n) \log p(n) \text{ subject to } \sum_{n \in N} p(n) H n = x,$$

$s \in S$, and $$\sum_{n \in N} p(n) = 1$$

over $p(n) \geq 0$, $n \in N$; $x_s$, $s \in S$. (7). The objective function is concave and differentiable and the constraints are linear, so Lagrangian methods may be used. The Lagrangian for the problem is $$L(p, x; \theta, \kappa) = \sum_{s \in S} d_s \log x_s - \sum_{n \in N} p(n) \log p(n) - \sum_{s \in S} \theta_s \left(x_s - \sum_{n \in N} p(n) \sum_{r \in R} H_{sr} n_r\right) - \kappa\left(1 - \sum_{n \in N} p(n)\right),$$

where $\theta_s$, $s \in S$, and $\kappa$ are Lagrange multipliers for the constraints. We know there exist Lagrange multipliers $\theta_s$, $s \in S$, $\kappa$ such that the Lagrangian is maximized at p, x that are feasible, and p, x are then, for the original problem.

We now attempt to maximize L over $p(n) \geq 0$ and $x_s \geq 0$. Differentiating with respect to $x_s$ gives $$\frac{\partial L}{\partial x_s} = \frac{d_s}{x_s} - \theta_s,$$

and differentiating with respect to p(n) gives $$\frac{\partial L}{\partial p(n)} = -1 - \log p(n) + \sum_{r \in R} \theta_{s(r)} n_r + \kappa.$$

At a maximum over $x_s$, we have that $$\theta_s = \frac{d_s}{x_s}. \quad (8)$$

At a maximum over p(n), $$p(n) = \exp\left(\kappa - 1 + \sum_{r \in R} \theta_{s(r)} n_r\right).$$

Choose κ so that (p(n),n∈N) sum to 1: then $$p(n) = \frac{\exp\left(\sum_{r \in R} \theta_{s(r)} n_r\right)}{\sum_{m \in N} \exp\left(\sum_{r \in R} \theta_{s(r)} m_r\right)},$$

of the form (6).

Thus the Markov chain (4)-(5) achieves an equilibrium distribution (6) that solves the optimization problem (7) provided the parameters ($\theta_s$, s∈S) are set to satisfy (8). The objective function of this optimization problem is the sum of the proportionally fair objective function (1) plus the entropy of the probability distribution (p(n),n∈N). The dual to the optimization problem (7) is to maximize $$V(\theta) = \sum_{s \in S} d_s \log \theta_s - \log\left(\sum_{n \in N} \exp\left(\sum_{s \in S} \theta_s \sum_{r \in R} H_{sr} n_r\right)\right)$$

over $\theta_s \geq 0$, s∈S. At the optimum $\theta_s = d_s/E_\theta[\Sigma_{r \in R} H_{sr} n_r]$ once again. This can be used to develop a convergence proof for sufficiently slow changes of ($\theta_s$, s∈S)—Exercise 7.23, [4]. When $\theta_s = \beta d_s/x_s$ then this corresponds to multiplying the first term of the objective function (7) by β, i.e. to increasing the importance of the proportionally fair objective function relative to the entropy term.

Aspects of this disclosure provide an adaptive method for choosing β. Since both β and ($\theta_s$, s∈S) may be time-varying, the Markov chain (4)-(5) may not be time-homogeneous. After an initial period of convergence, both β and ($\theta_s$, s∈S) may become relatively stable. Although β and ($\theta_s$, s∈S) may fluctuate with the random transitions of the Markov chain, these fluctuations may be comparable with fluctuations in the numbers of users ($d_s$, s∈S).

The rate at which paths serving access point s are torn down and set up, are $\gamma m_s$ and $k_s \gamma \exp(\theta_s)$ respectively. Thus in equilibrium $m_s \approx k_s \exp(\theta_s)$, and thus $$\theta_s \approx \log\left(\frac{m_s}{k_s}\right).$$

The ratio $m_s/k_s$ is the ratio of paths in use to paths not currently in use but individually system feasible for access point s: so it may be helpful to set the average value of $\theta_s$ over s∈S to be say log [intensity/(1−intensity)] where intensity=90%, where log is the natural logarithm. Thus $\log_{10} z = (\log_{10} e) \log z$. Accordingly, $\theta_s$ may be updated according to $$\theta_s = \beta \frac{d_s}{m_s},$$

where $$\beta = \frac{S \log[9]}{\sum_{s \in S} \frac{d_s}{m_s}}$$

to ensure that $\Sigma_{s \in S} \theta_s/S = \log[9]$.

This approach is relatively aggressive in so far as it uses instantaneous value of $m_s$ rather than its time-average $x_s$, as well as because it does not dampen the updates to $\theta_s$. In some embodiment, s the $\exp(\theta_s)$ is averaged, rather than $\theta_s$.

In networks with less symmetry, it is possible to update $\theta_s$ by setting it to $$\theta_s = \beta \frac{d_s}{m_s}$$

where $$\beta = \frac{\sum_{s \in S} d_s}{\sum_{s \in S} \frac{d_s^2}{m_s}} \log[9];$$

this may ensure that the weighted average $\Sigma_{s \in S} d_s \theta_s / \Sigma_{s \in S} d_s = \log[9]$.

In an embodiment, $N \subset \{0,1\}^R$ is the set of feasible states, and $$h_s = \sum_{r \in R} H_{sr}, \quad m_s = \sum_{r \in R} H_{sr} n_r,$$

respectively are the number of paths each individually capable of serving access point s (note that these may not be compatible with each other, so the maximum capacity available to access point s may be less than $h_s$), and the number of paths currently set up from access point s. Now let n be a Markov process with state space N and transition rates $2q(n, n-e_r) = \gamma$ if $n_r = 1$, (9)

$$q(n, n+e_r) = \frac{\gamma}{h_s} \exp(\theta_{s(r)})$$

if $n+e_r \in N$, (10) for r∈R. Again a path that is set up remains so for a time that is exponentially distributed with parameter γ. The rate (10) corresponds to access point s attempting to set up a path at rate $\gamma \exp(\theta_{s(r)})$, and choosing at random one of the $h_s$ paths from access point s to to try. (Under the preliminary model, access point s attempts to set up a path at rate $\gamma h_s \exp(\theta_{s(r)})$, choosing at random one of the $h_s$ paths to try. Thus the preliminary model is more aggressive for access points s for which $h_s$ is larger.)

The equilibrium distribution for $n=(n_r, r \in R)$ can be written in the form $$\pi_\theta(n) = B \prod_{s \in S} (h_s^{-m_s} \exp(\theta_s m_s)),$$

$n \in N$, (11), where B is a normalizing constant chosen so that the distribution (11) sums to one. If we set $\theta$ by the relation $$\theta_s = \beta \frac{d_s}{x_s},$$

then the distribution (11) solves the optimization problem (7) with the amended objective function $$\beta \sum_{s \in S} d_s \log x_s - \sum_{n \in N} p(n) \log \left( p(n) \prod_{s \in S} h_s^{m_s} \right).$$

[Equivalently, the distribution (11) solves the optimization problem (7) with its entropy term replaced by minus the Kullback€"-Leibler divergence of the distribution (p(n), $n \in N$) from the distribution where the components of n are independent Bernoulli random variables, $n_r$ with mean $1/(1+h_{s(r)})$.]

In another embodiment, n is a Markov process with state space N and transition rates $q(n, n-e_r) = \gamma$ if $n=1$, (12)

$$q(n, n + e_r) = \frac{\gamma}{h_s - m_s} \exp(\theta_{s(r)})$$

if $n+e_r \in N$, (13) for $r \in R$. Again a path that is set up remains so for a time that is exponentially distributed with parameter $\gamma$. The rate (13) corresponds to access point s attempting to set up a path at rate $\gamma \exp(\theta_{s(r)})$, and choosing at random one of the $h_s - m_s$ paths it is not already using to try.

The equilibrium distribution for $n=(n_r, r \in R)$ can be written in the form $$\pi_\theta(n) = B \prod_{s \in S} ((h_s - m_s)! \exp(\theta_s m_s)),$$

$n \in N$, (14) where B is a normalizing constant chosen so that the distribution (14) sums to one. If we set $\theta$ by the relation $$\theta_s = \beta \frac{d_s}{x_s},$$

then the distribution (14) solves the optimization problem (7) with the amended objective function $$\beta \sum_{s \in S} d_s \log x_s - \sum_{m \in N} p(n) \log \left( \frac{p(n)}{\prod_{s \in S} (h_s - m_s)!} \right).$$

Figure 16:
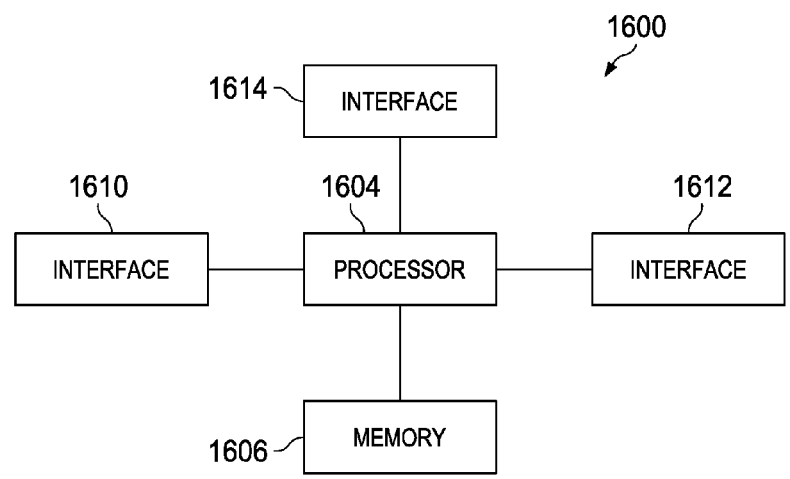
FIG. 16 illustrates a diagram of an embodiment processing system.

FIG. 16 illustrates a block diagram of an embodiment processing system 1600 for performing methods described herein, which may be installed in a host device. As shown, the processing system 1600 includes a processor 1604, a memory 1606, and interfaces 1610-1614, which may (or may not) be arranged as shown in FIG. 16. The processor 1604 may be any component or collection of components adapted to perform computations and/or other processing related tasks, and the memory 1606 may be any component or collection of components adapted to store programming and/or instructions for execution by the processor 1604. In an embodiment, the memory 1606 includes a non-transitory computer readable medium. The interfaces 1610, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in FIG. 16, such as long term storage (e.g., non-volatile memory, etc.).

In some embodiments, the processing system 1600 is included in a network device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 17:
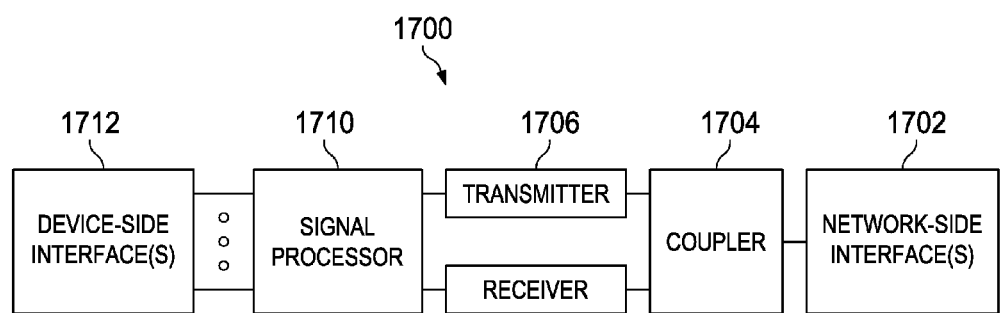
FIG. 17 illustrates a diagram of an embodiment transceiver.

In some embodiments, one or more of the interfaces 1610, 1612, 1614 connects the processing system 1600 to a transceiver adapted to transmit and receive signaling over the telecommunications network. FIG. 17 illustrates a block diagram of a transceiver 1700 adapted to transmit and receive signaling over a telecommunications network. The transceiver 1700 may be installed in a host device. As shown, the transceiver 1700 comprises a network-side interface 1702, a coupler 1704, a transmitter 1706, a receiver 1708, a signal processor 1710, and a device-side interface 1712. The network-side interface 1702 may include any component or collection of components adapted to transmit or receive signaling over a wireless or wireline telecommunications network. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. The receiver 1708 may include any component or collection of components (e.g., downconverter, low noise amplifier, etc.) adapted to convert a carrier signal received over the network-side interface 1702 into a baseband signal. The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 1600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for scheduling wireless transmissions, the method comprising:
    selecting routes between access nodes and one or more gateways in a wireless mesh network, each of the routes including one or more wireless links;
    mapping wireless links in at least some of the routes to timeslots of a frame to form a plurality of synchronized paths between the access nodes and the gateways;
    iteratively adding, or removing, an individual one of the plurality of synchronized paths to, or from, a TDM routing schedule according to each individual state in a state progression of a Markov chain, the TDM routing schedule including a different subset of synchronized paths for each state in the Markov chain; and
    instructing the access nodes and the one or more gateways to communicate messages over the wireless links according the TDM routing schedule.

2. The method of claim 1, wherein the state progression through the Markov chain progresses through fewer than all states in the Markov chain.

3. The method of claim 1, wherein each state in the progression through states of the Markov chain maps a different combination of synchronized paths to the TDM routing schedule.

4. The method of claim 3, wherein iteratively adding, or removing, an individual one of the plurality of synchronized paths to, or from, the TDM routing schedule according to each individual state in the state progression of the Markov chain comprises:
    transitioning from a previous state in the Markov chain to a subsequent state in the Markov chain based on a proportionally fair transition rate.

5. The method of claim 4, wherein transitioning from the previous state in the Markov chain to the subsequent state in the Markov chain comprises:
    adding a first synchronized path to the TDM routing schedule when the first synchronized path is mapped to the TDM routing schedule by the subsequent state of the Markov chain without being mapped to the TDM routing schedule by the previous state of the Markov chain.

6. The method of claim 3, wherein iteratively adding, or removing, an individual one of the plurality of synchronized paths to, or from, the TDM routing schedule according to each state during a progression through states of a Markov chain comprises:
    determining whether a first synchronized path mapped to the TDM routing schedule by the subsequent state of the Markov chain is feasible based on an interference model of the mesh network; and
    adding the first synchronized path to the TDM routing schedule if the first synchronized path is feasible.

7. The method of claim 6, wherein the interference model is a protocol interference model between the wireless links, the protocol interference model prohibiting transmissions from being scheduled over two or more interfering links during the same timeslot of the frame.

8. The method of claim 6, wherein the interference model is a physical interference model between the wireless links, the physical interference model permitting transmissions to be scheduled over two or more interfering links during the same timeslot of the frame when an interference cost associated with the transmissions is less than a threshold.

9. The method of claim 8, wherein the interference costs vary based on the amount of interference experienced between transmissions performed over the two or more interfering links during the same period.

10. The method of claim 1, wherein iteratively adding, or removing, an individual one of the plurality of synchronized paths to, or from, the TDM routing schedule according to each individual state in the state progression of the Markov chain comprises:
    transitioning from a previous state in the Markov chain to a current state in the Markov chain based on a transition rate of the Markov chain; and
    adjusting the transition rate of the Markov chain based on a ratio of users to synchronized paths specified by the subsequent state in the Markov chain.

11. The method of claim 10, wherein the ratio of users to synchronized paths includes a summation of ratios between users accessing each of the access nodes and synchronized paths assigned to the corresponding access point in the TDM routing schedule.

12. The method of claim 10, wherein the transition is decreased when the ratio of users to synchronized paths specified by the subsequent state in the Markov chain exceeds a ratio of users to synchronized paths specified by the previous state in the Markov chain.

13. An apparatus comprising:
a processor; and
a non-transitory computer readable storage medium storing programming for execution by the processor, the programming including instructions to:
select routes between access nodes and one or more gateways in a wireless mesh network, each of the routes including one or more wireless links;
map wireless links in at least some of the routes to timeslots of a frame to form a plurality of synchronized paths between the access nodes and the gateways;
iteratively add, or remove, an individual one of the plurality of synchronized paths to, or from, a TDM routing schedule according to each individual state in a state progression of a Markov chain, the TDM routing schedule including a different subset of synchronized paths for each state in the Markov chain; and
instruct the access nodes and the one or more gateways to communicate messages over the wireless links according the TDM routing schedule.

14. The apparatus of claim 13, wherein the state progression through the Markov chain progresses through fewer than all states in the Markov chain.

15. The apparatus of claim 13, wherein each state in the progression through states of the Markov chain maps a different combination of synchronized paths to the TDM routing schedule.

16. The apparatus of claim 15, wherein the instructions to iteratively add, or remove, an individual one of the plurality of synchronized paths to, or from, the TDM routing schedule according to each individual state in the state progression of the Markov chain includes instructions to:
transition from a previous state in the Markov chain to a subsequent state in the Markov chain based on a proportionally fair transition rate.

17. The apparatus of claim 16, wherein the instructions to transition from the previous state in the Markov chain to the subsequent state in the Markov chain include instructions to:
add a first synchronized path to the TDM routing schedule when the first synchronized path is mapped to the TDM routing schedule by the subsequent state of the Markov chain without being mapped to the TDM routing schedule by the previous state of the Markov chain.

18. The apparatus of claim 16, wherein the instructions to iteratively add, or remove, an individual one of the plurality of synchronized paths to, or from, the TDM routing schedule according to each individual state in the state progression of the Markov chain includes instructions to:
determine whether a first synchronized path mapped to the TDM routing schedule by the subsequent state of the Markov chain is feasible based on an interference model of the mesh network; and
add the first synchronized path to the TDM routing schedule if the first synchronized path is feasible.

19. The apparatus of claim 18, wherein the interference model is a protocol interference model between the wireless links, the protocol interference model prohibiting transmissions from being scheduled over two or more interfering links during the same timeslot of the frame.

20. The apparatus of claim 18, wherein the interference model is a physical interference model between the wireless links, the physical interference model permitting transmissions to be scheduled over two or more interfering links during the same timeslot of the frame when an interference cost associated with the transmissions is less than a threshold.

21. The apparatus of claim 20, wherein the interference costs vary based on the amount of interference experienced between transmissions performed over the two or more interfering links during the same period.

22. A computer program product comprising a non-transitory computer readable storage medium storing programming, the programming including instructions to:
select routes between access nodes and one or more gateways in a wireless mesh network, each of the routes including one or more wireless links;
map wireless links in at least some of the routes to timeslots of a frame to form a plurality of synchronized paths between the access nodes and the gateways;
iteratively add, or remove, an individual one of the plurality of synchronized paths to, or from, a TDM routing schedule according to each individual state in a state progression of a Markov chain, the TDM routing schedule including a different subset of synchronized paths for each state in the Markov chain; and
instruct the access nodes and the one or more gateways to communicate messages over the wireless links according the TDM routing schedule.

23. The computer program product of claim 22, wherein the state progression through the Markov chain progresses through fewer than all states in the Markov chain.

24. The computer program product of claim 22, wherein each state in the progression through states of the Markov chain maps a different combination of synchronized paths to the TDM routing schedule.

* * * * *